(12) United States Patent
Matzen

(10) Patent No.: US 9,188,091 B2
(45) Date of Patent: Nov. 17, 2015

(54) FLEXIBLE TUBULAR MOLDED BODY, SUCH AS BELLOWS, AND METHOD FOR THE MANUFACTURE THEREOF

(76) Inventor: Ralph-Guenther Matzen, Lueneburg (DE)

( * ) Notice: Subject to any disclaimer, the term of this patent is extended or adjusted under 35 U.S.C. 154(b) by 389 days.

(21) Appl. No.: 13/592,860

(22) Filed: Aug. 23, 2012

(65) Prior Publication Data

US 2014/0027001 A1 Jan. 30, 2014

(30) Foreign Application Priority Data

Jul. 26, 2012 (EP) ...................................... 12178108

(51) Int. Cl.

| | |
|---|---|
| *F16L 11/04* | (2006.01) |
| *F02M 35/10* | (2006.01) |
| *F16L 11/112* | (2006.01) |
| *F16L 27/10* | (2006.01) |
| *F16L 27/111* | (2006.01) |
| *F16L 51/02* | (2006.01) |
| *B29C 70/32* | (2006.01) |
| *B29C 70/34* | (2006.01) |
| *B29C 70/44* | (2006.01) |
| *B29C 70/52* | (2006.01) |
| *B29C 47/02* | (2006.01) |
| *B29C 47/04* | (2006.01) |
| *B29L 23/18* | (2006.01) |
| *B29C 47/00* | (2006.01) |
| *B29C 47/10* | (2006.01) |
| *B29C 47/28* | (2006.01) |

(52) U.S. Cl.
CPC ........ *F02M 35/10334* (2013.01); *B29C 47/021* (2013.01); *B29C 47/027* (2013.01); *B29C 47/04* (2013.01); *B29C 70/32* (2013.01); *B29C 70/342* (2013.01); *B29C 70/446* (2013.01); *B29C 70/523* (2013.01); *F02M 35/10137* (2013.01); *F02M 35/10157* (2013.01); *F02M 35/10321* (2013.01); *F16L 11/112* (2013.01); *F16L 27/1004* (2013.01); *F16L 27/111* (2013.01); *F16L 51/025* (2013.01); *B29C 47/0023* (2013.01); *B29C 47/0066* (2013.01); *B29C 47/1036* (2013.01); *B29C 47/28* (2013.01); *B29L 2023/18* (2013.01); *Y02T 10/144* (2013.01)

(58) Field of Classification Search
CPC ... F16L 11/112; F16L 27/1004; F16L 27/111; F16L 51/025
USPC ............... 138/121, 137; 264/209.3, 299, 501; 156/123
See application file for complete search history.

(56) References Cited

U.S. PATENT DOCUMENTS

| | | | | |
|---|---|---|---|---|
| 1,361,001 A | * | 12/1920 | Blaisdell | 156/86 |
| 1,535,647 A | * | 4/1925 | Brennan | 138/137 |
| 1,648,046 A | * | 11/1927 | Fulton | 138/121 |

(Continued)

FOREIGN PATENT DOCUMENTS

| | | |
|---|---|---|
| DE | 202004018301 U1 | 11/2004 |
| EP | 1013979 A2 | 6/2000 |

*Primary Examiner* — Donnell Long
(74) *Attorney, Agent, or Firm* — McCormick, Paulding & Huber, LLP

(57) ABSTRACT

The flexible tubular molded body (10) comprises an unprofiled or profiled straight or bent shaped and a circumferential wall (11) provided with a corrugated profile (12), which is formed from a strength support insert embedded in a thermoplastic material comprising cord surfaces running in the longitudinal direction of the molded body as pressure support elements and fixing threads running transversely to the threads and holding these in position.

11 Claims, 27 Drawing Sheets

(56) References Cited

U.S. PATENT DOCUMENTS

| | | | |
|---|---|---|---|
| 1,746,701 A * | 2/1930 | Kimmich | 138/121 |
| 2,097,862 A * | 11/1937 | McKay | 138/126 |
| 2,143,960 A * | 1/1939 | Stalter et al. | 138/110 |
| 2,299,520 A * | 10/1942 | Yant | 264/294 |
| 2,312,587 A * | 3/1943 | Price | 249/65 |
| 4,196,031 A * | 4/1980 | Lalikos et al. | 156/143 |
| 5,482,089 A * | 1/1996 | Weber et al. | 138/122 |
| 5,485,870 A * | 1/1996 | Kraik | 138/122 |
| 2002/0006491 A1 * | 1/2002 | Ito et al. | 428/36.91 |
| 2002/0062873 A1 * | 5/2002 | Nakagawa et al. | 138/122 |
| 2003/0024586 A1 * | 2/2003 | Koenen | 138/121 |
| 2004/0007278 A1 * | 1/2004 | Williams | 138/121 |
| 2007/0137718 A1 * | 6/2007 | Rushlander et al. | 138/121 |
| 2008/0000540 A1 | 1/2008 | Seyler | |

\* cited by examiner

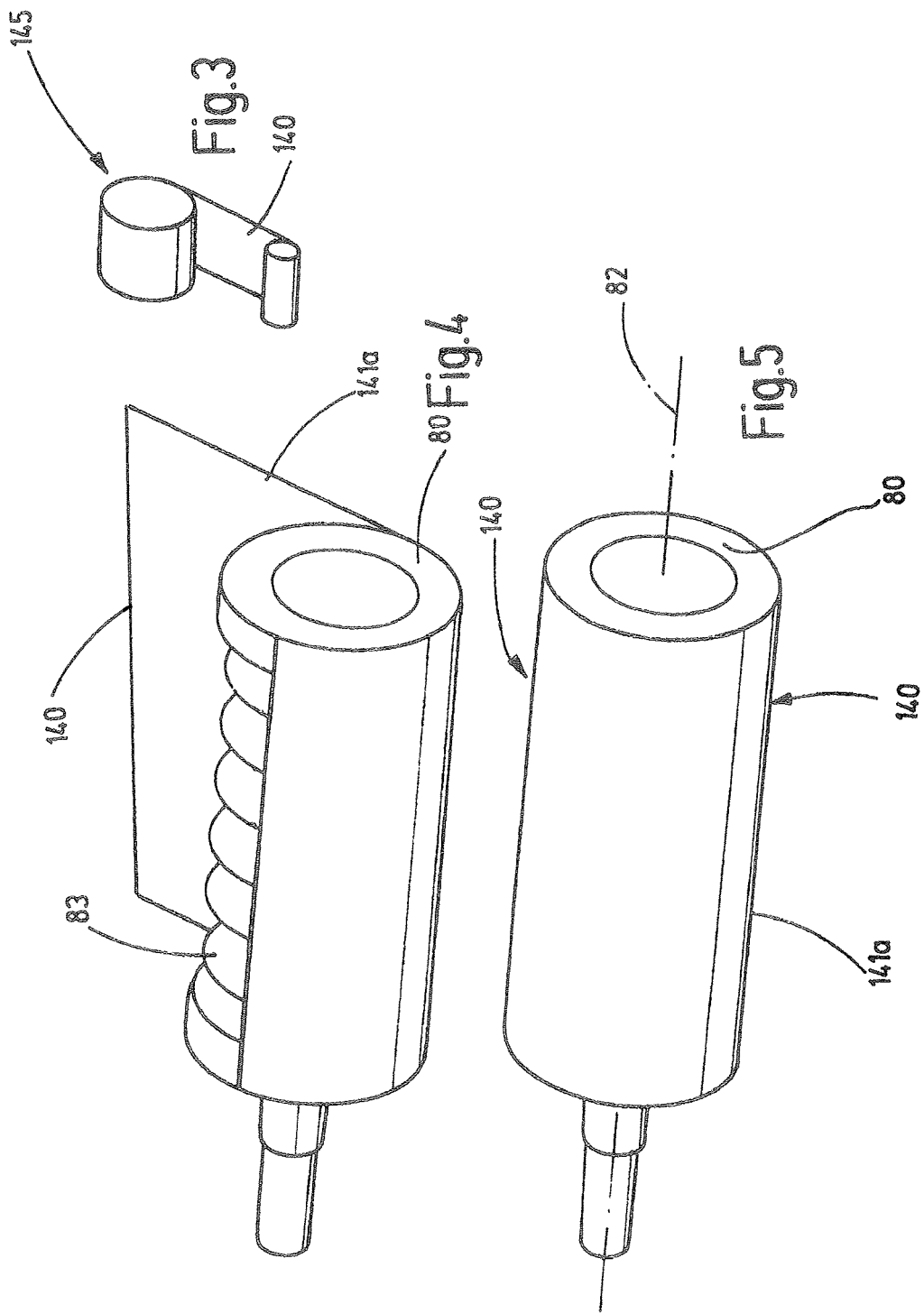

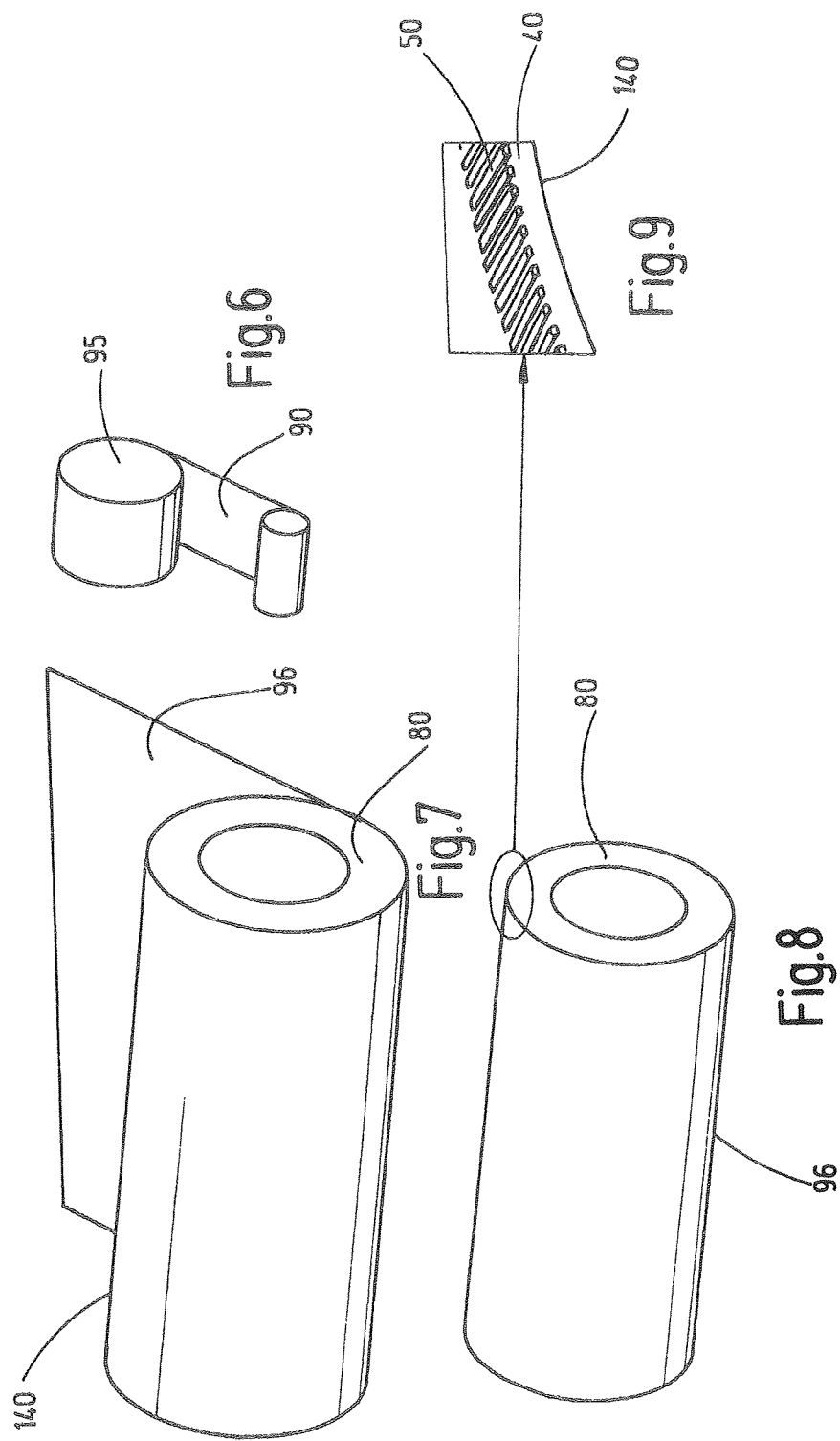

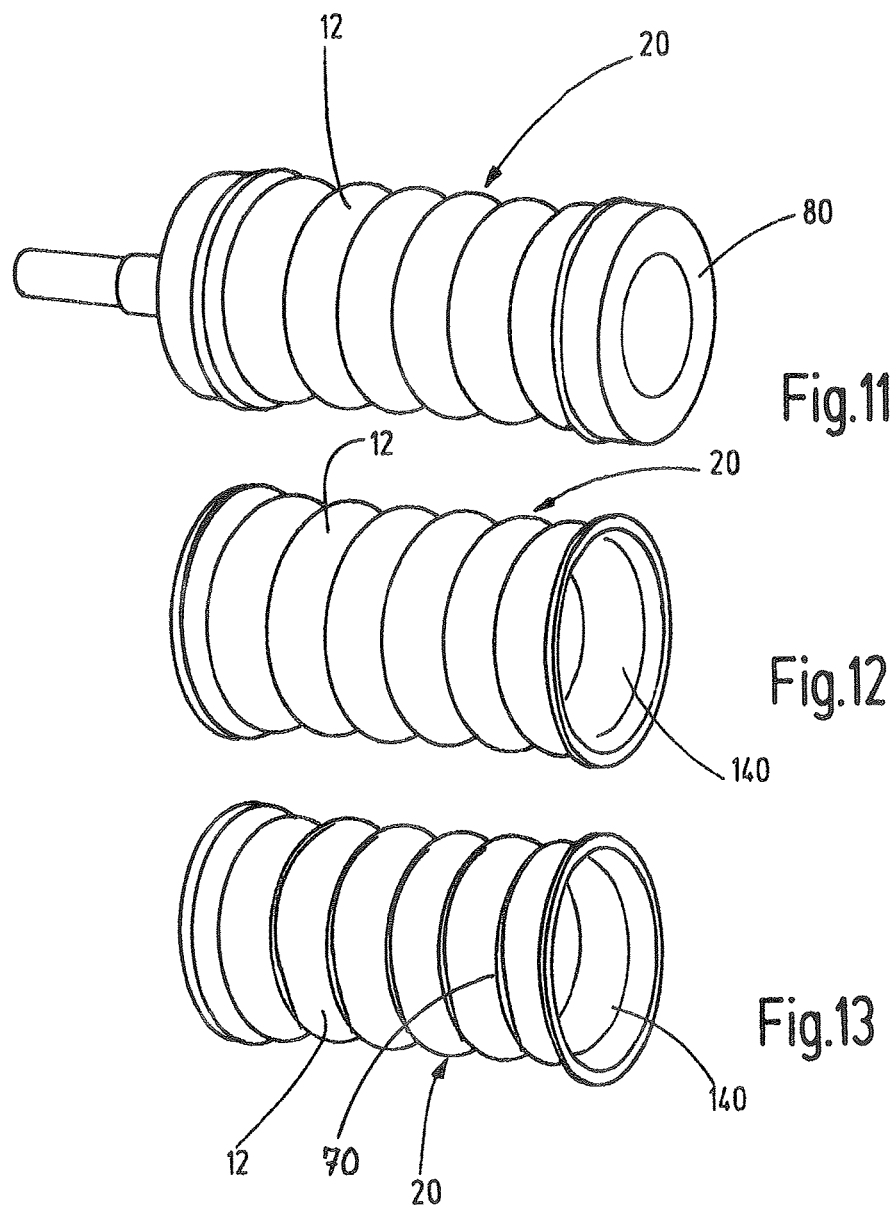

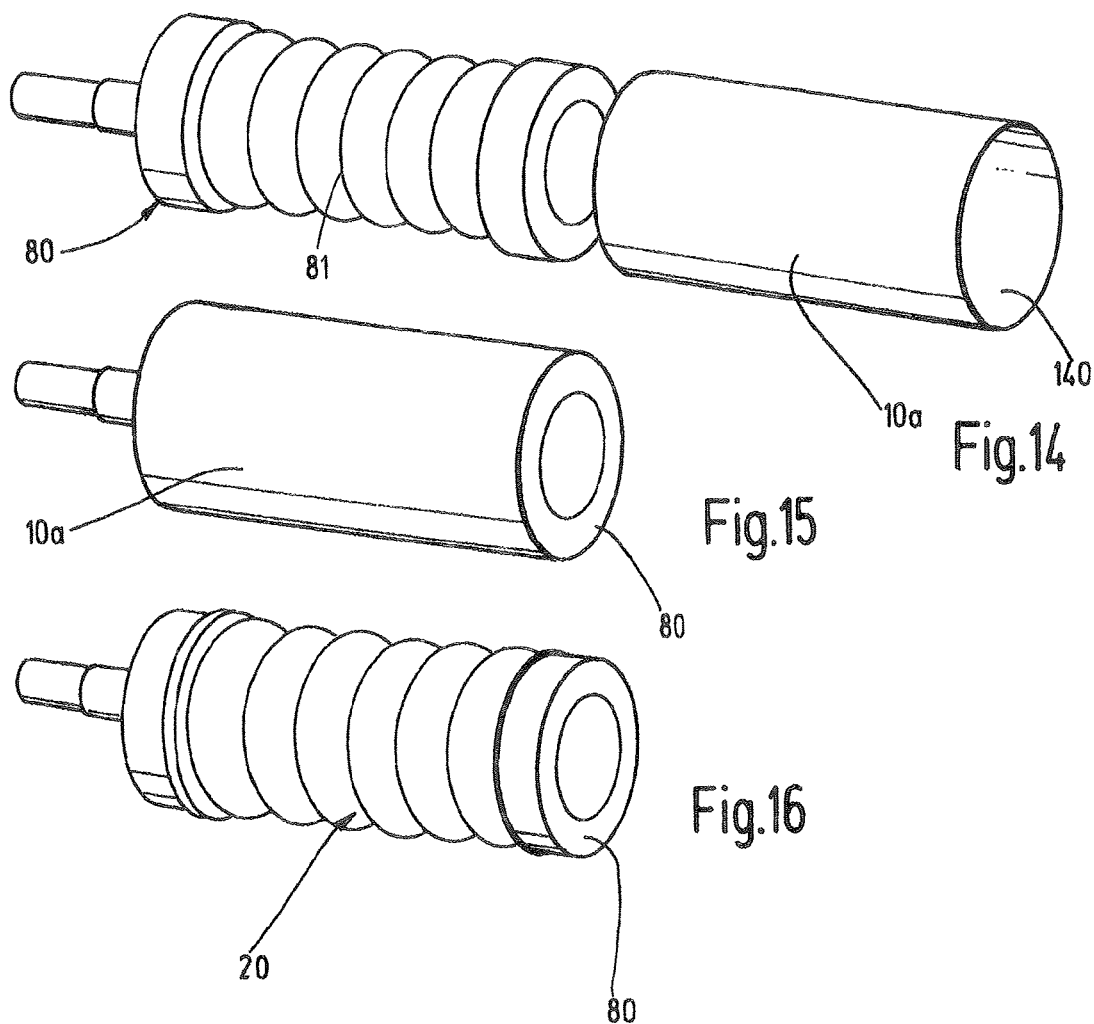

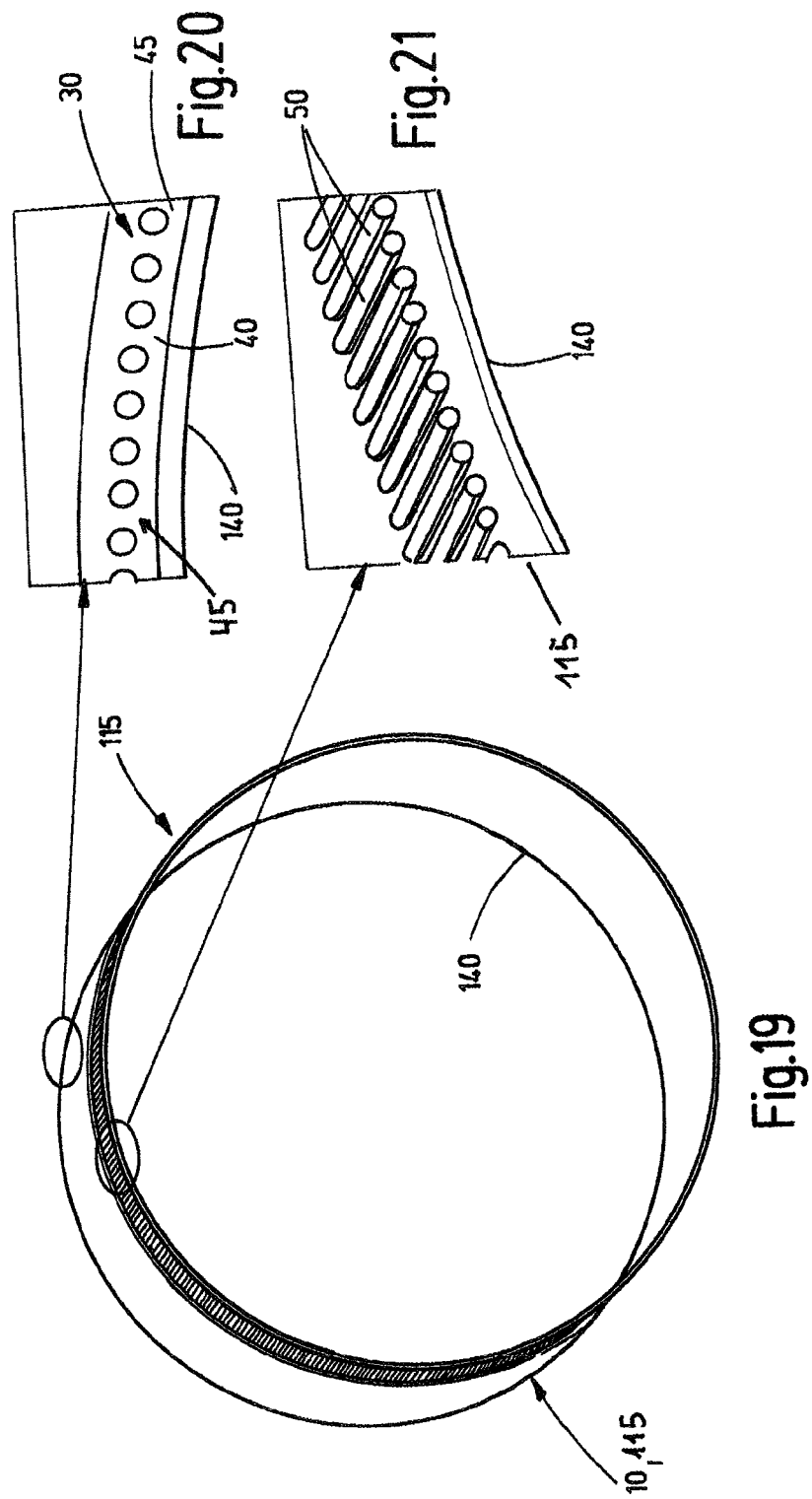

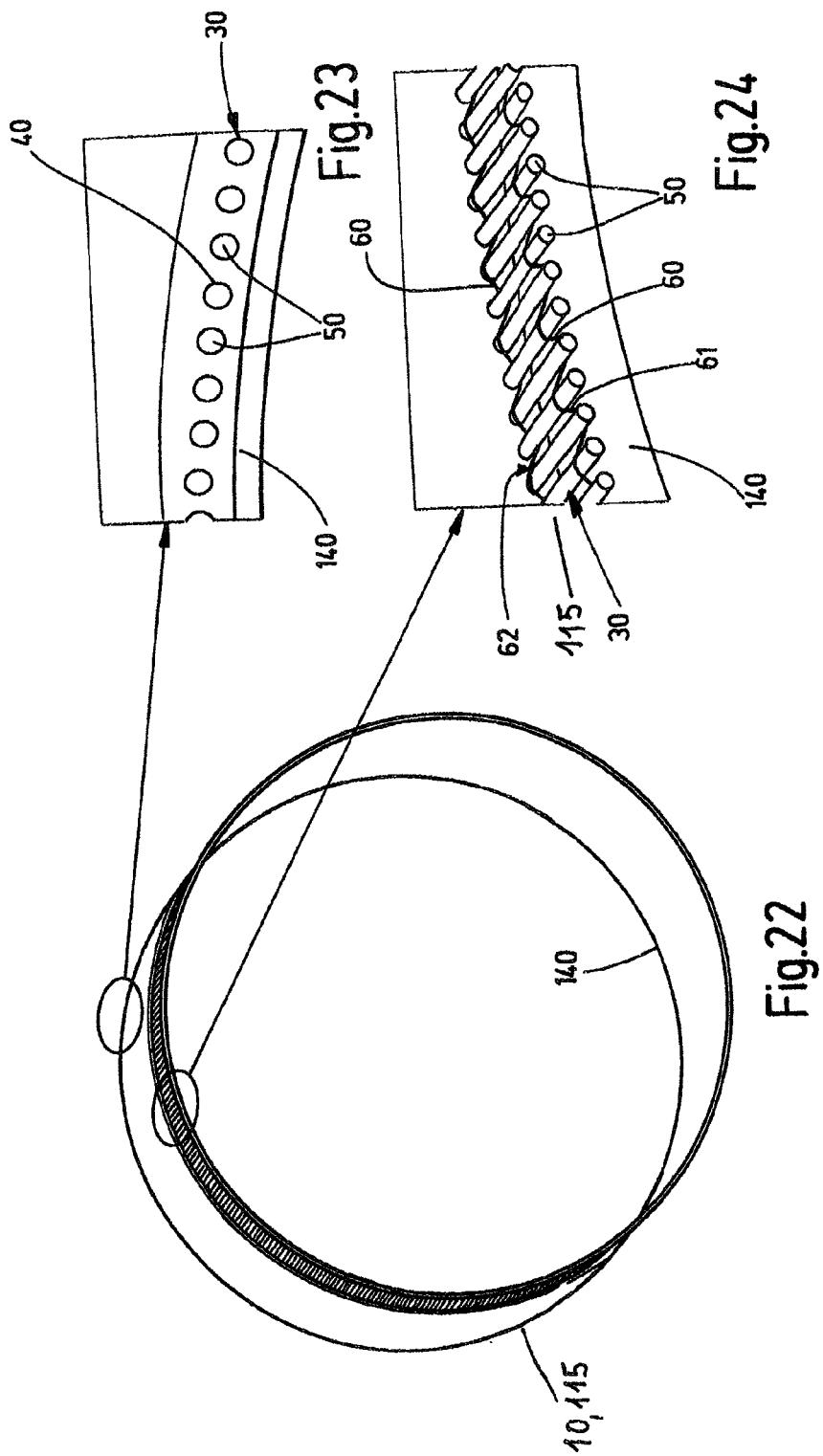

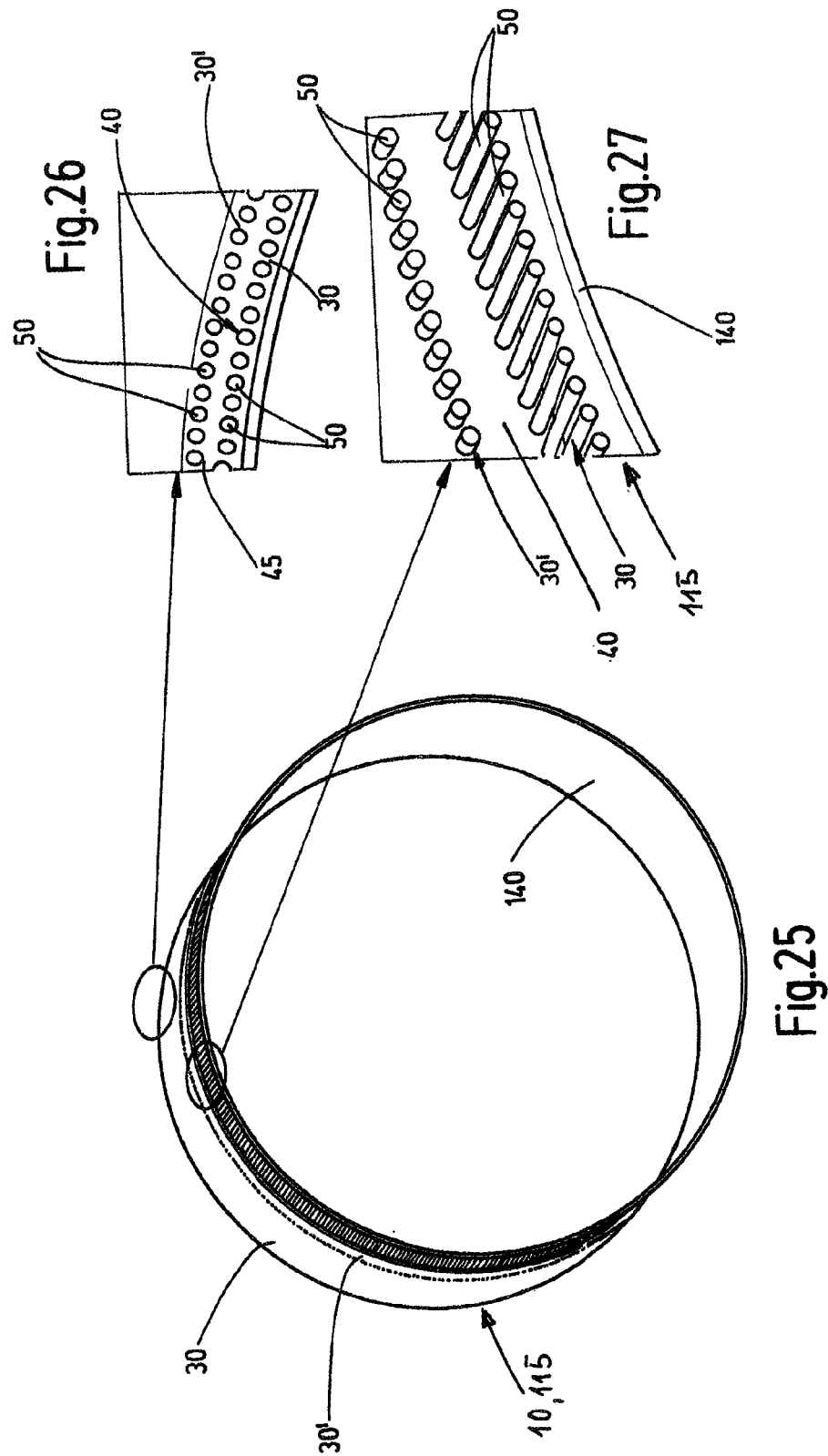

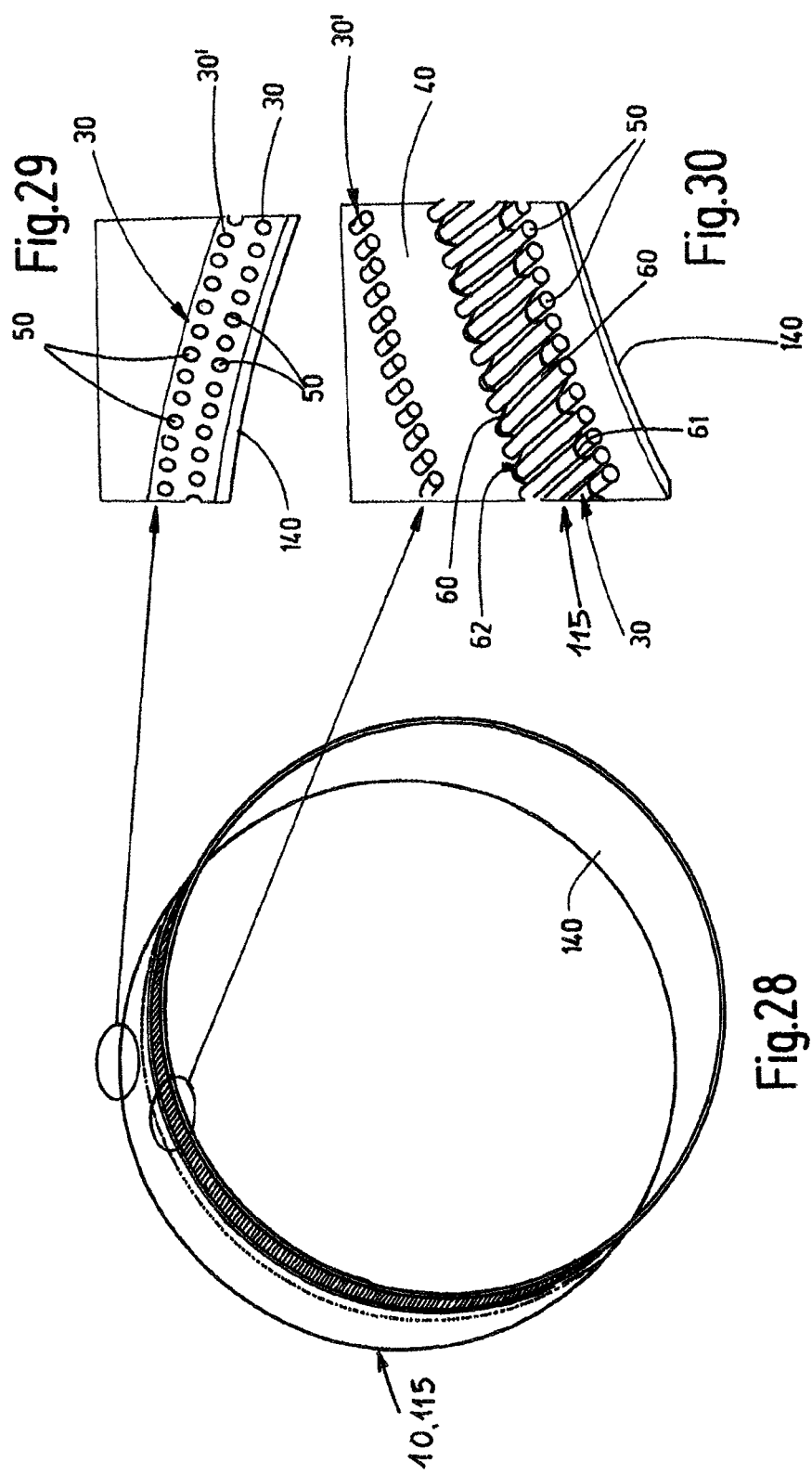

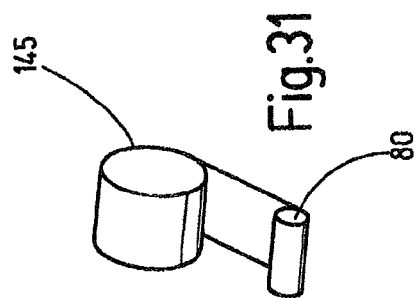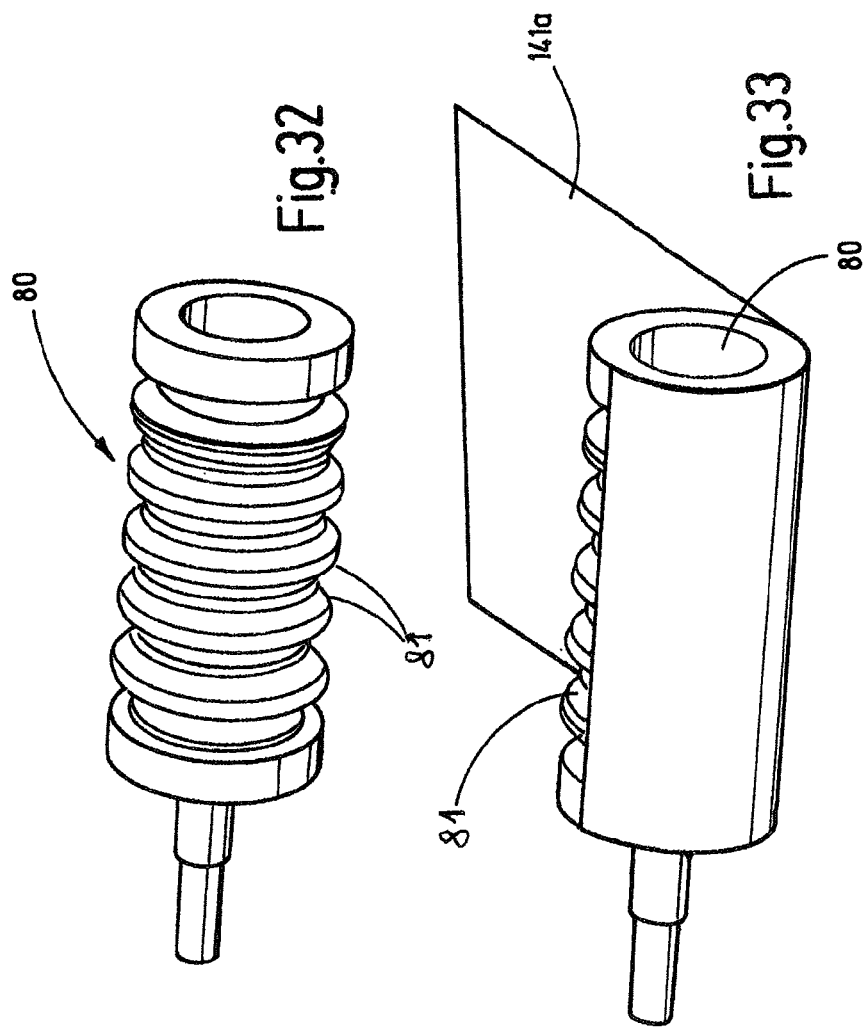

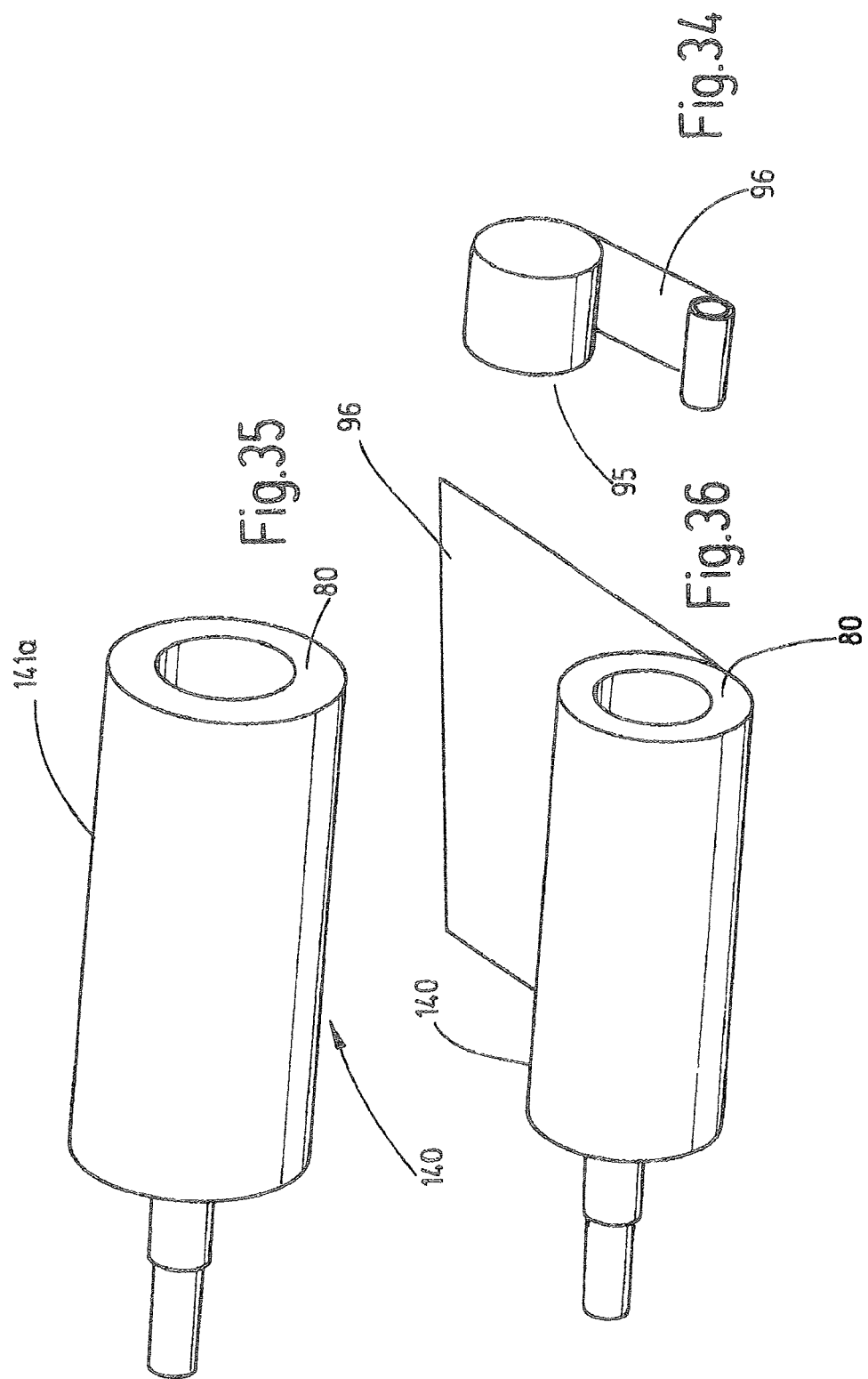

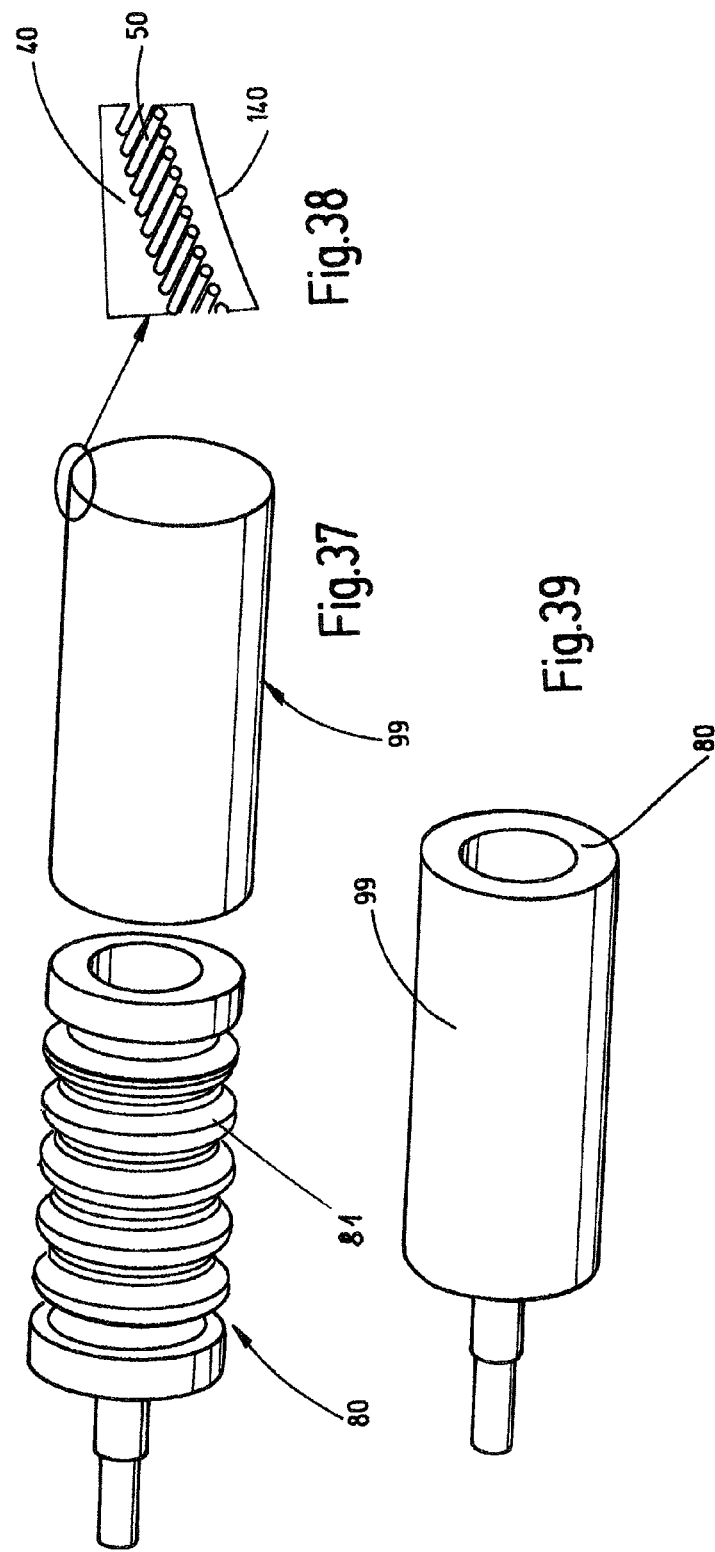

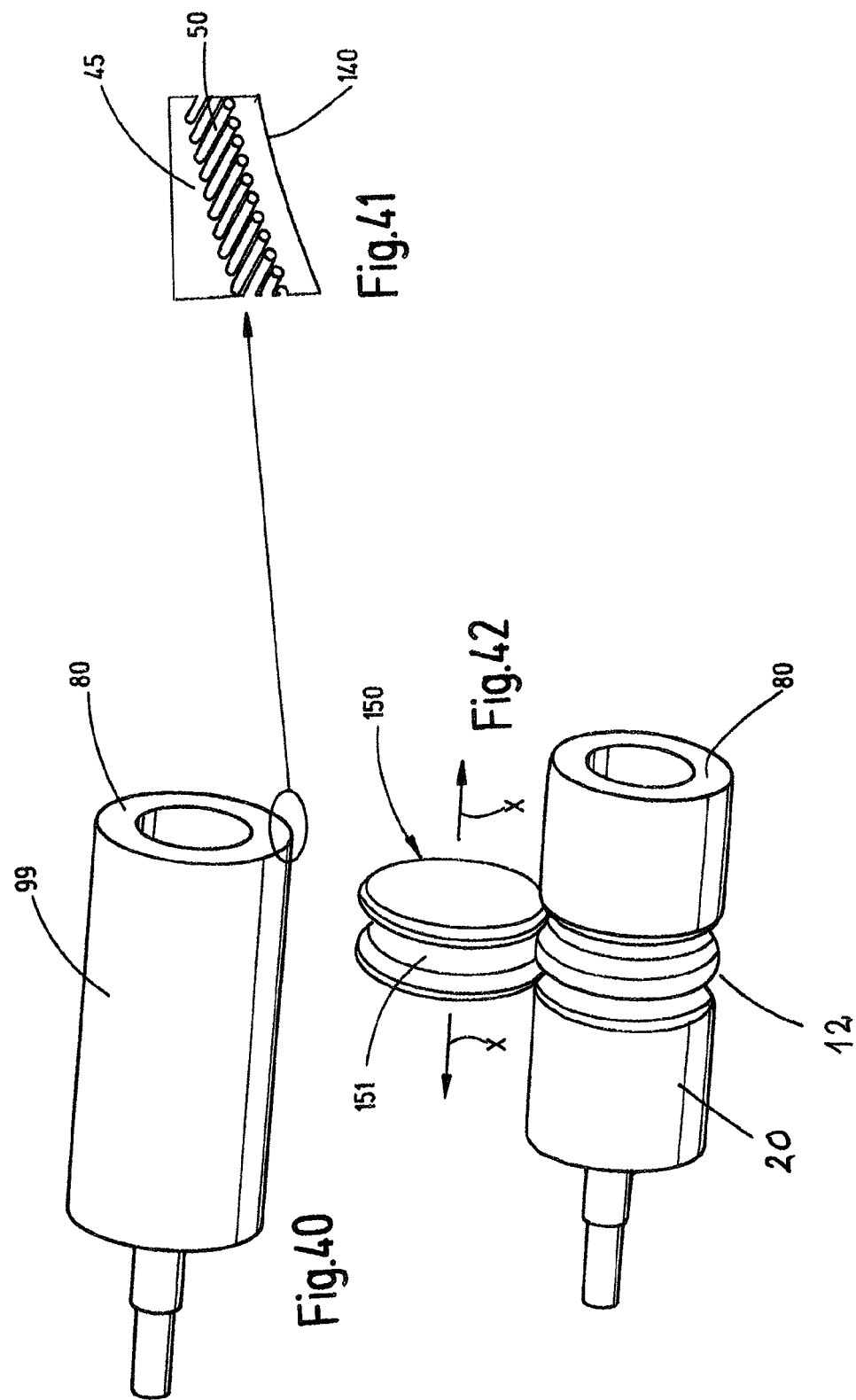

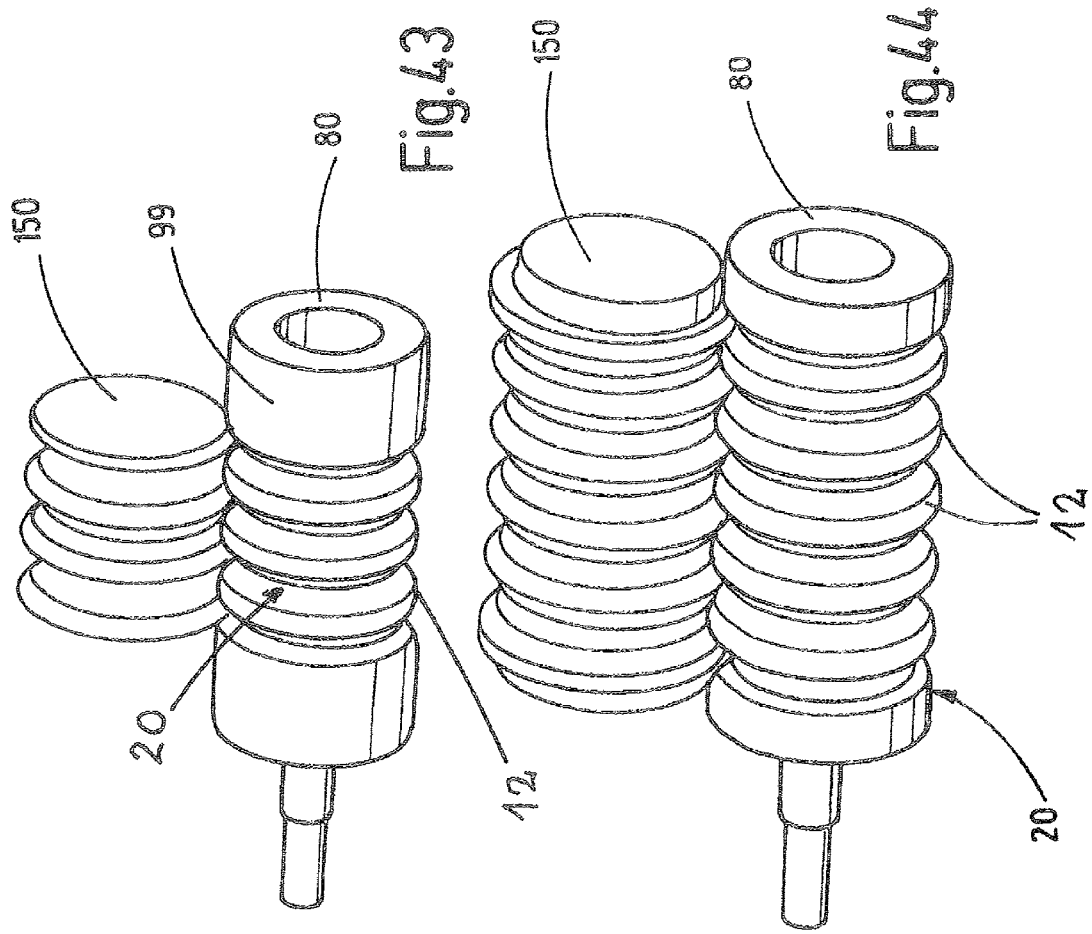

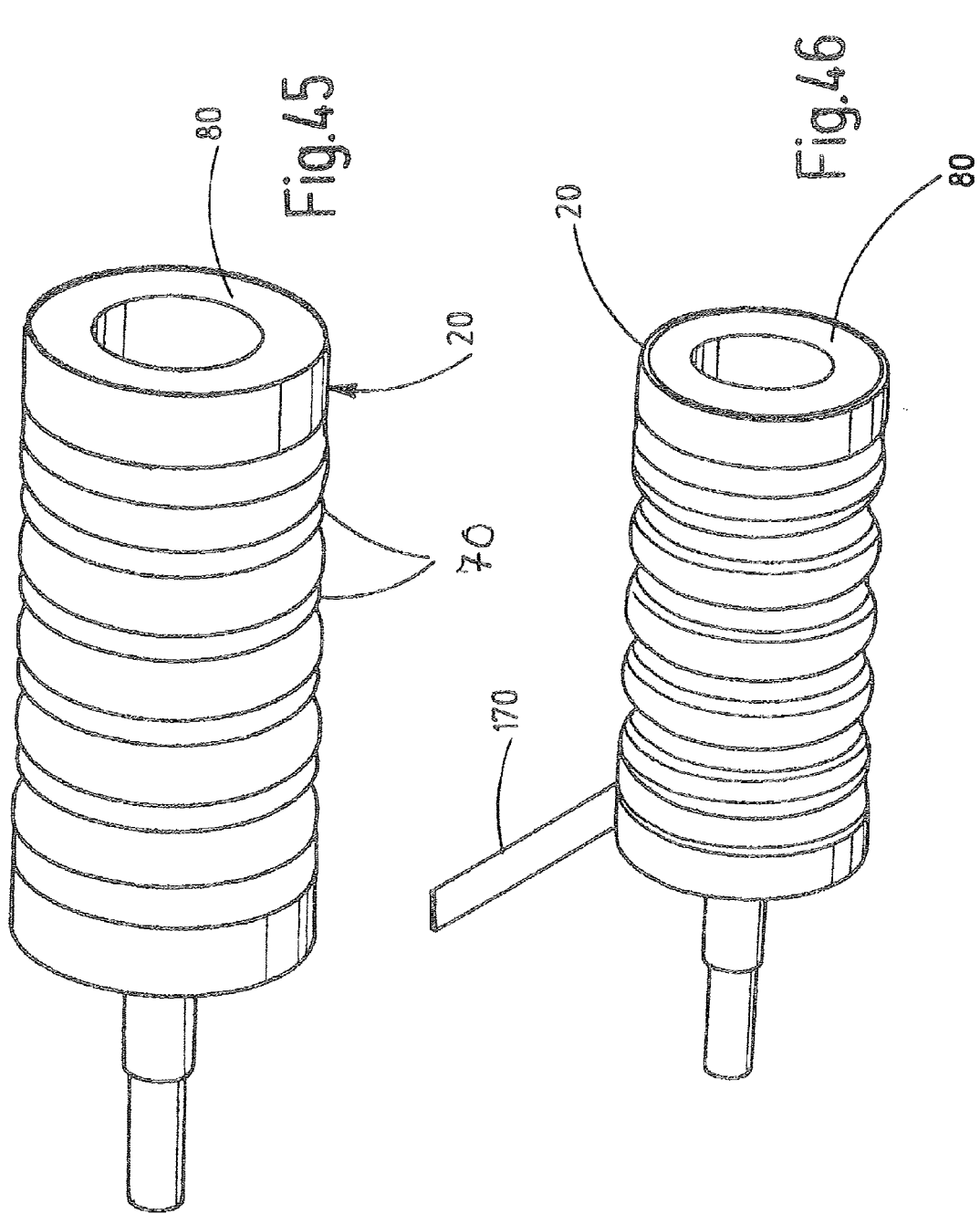

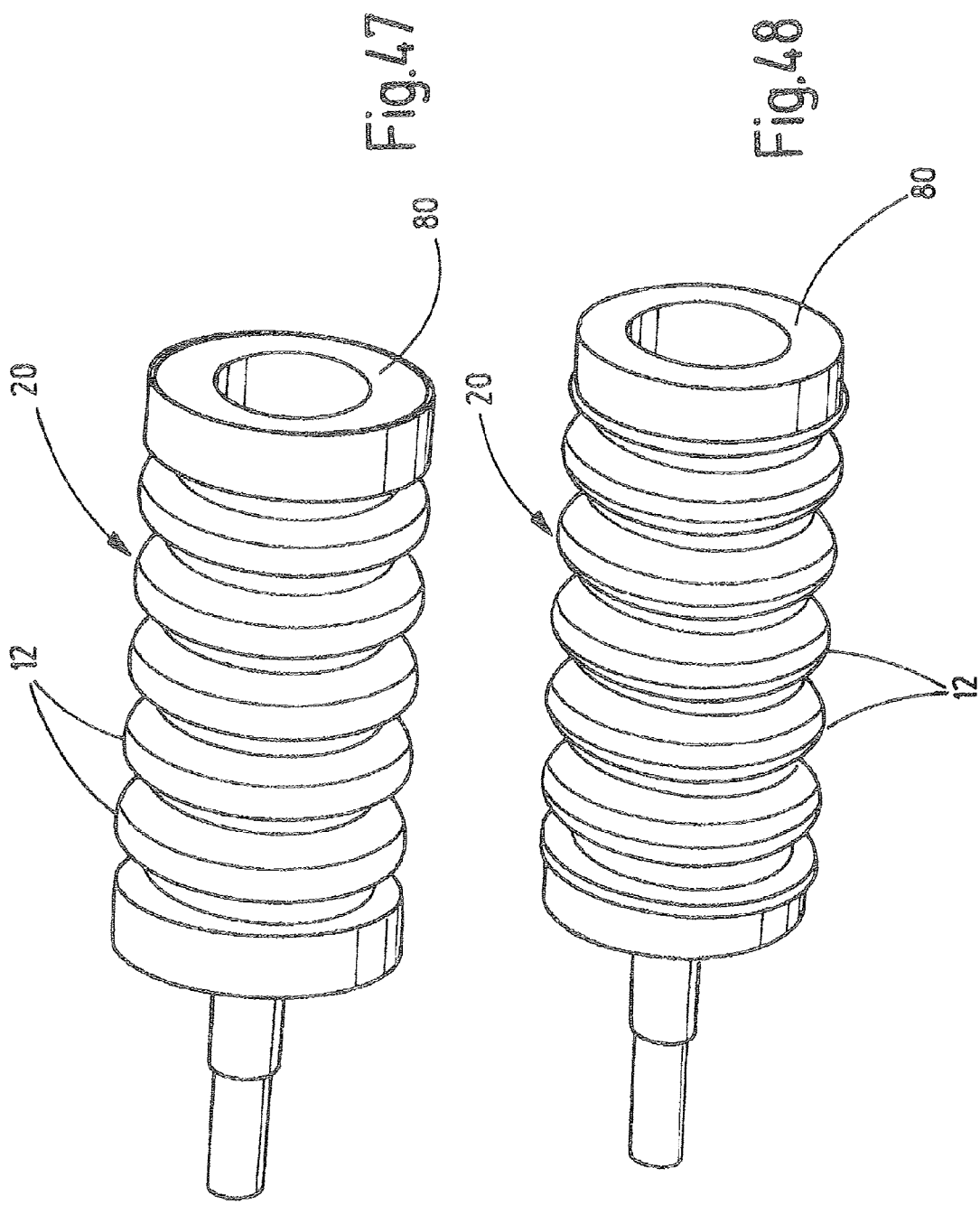

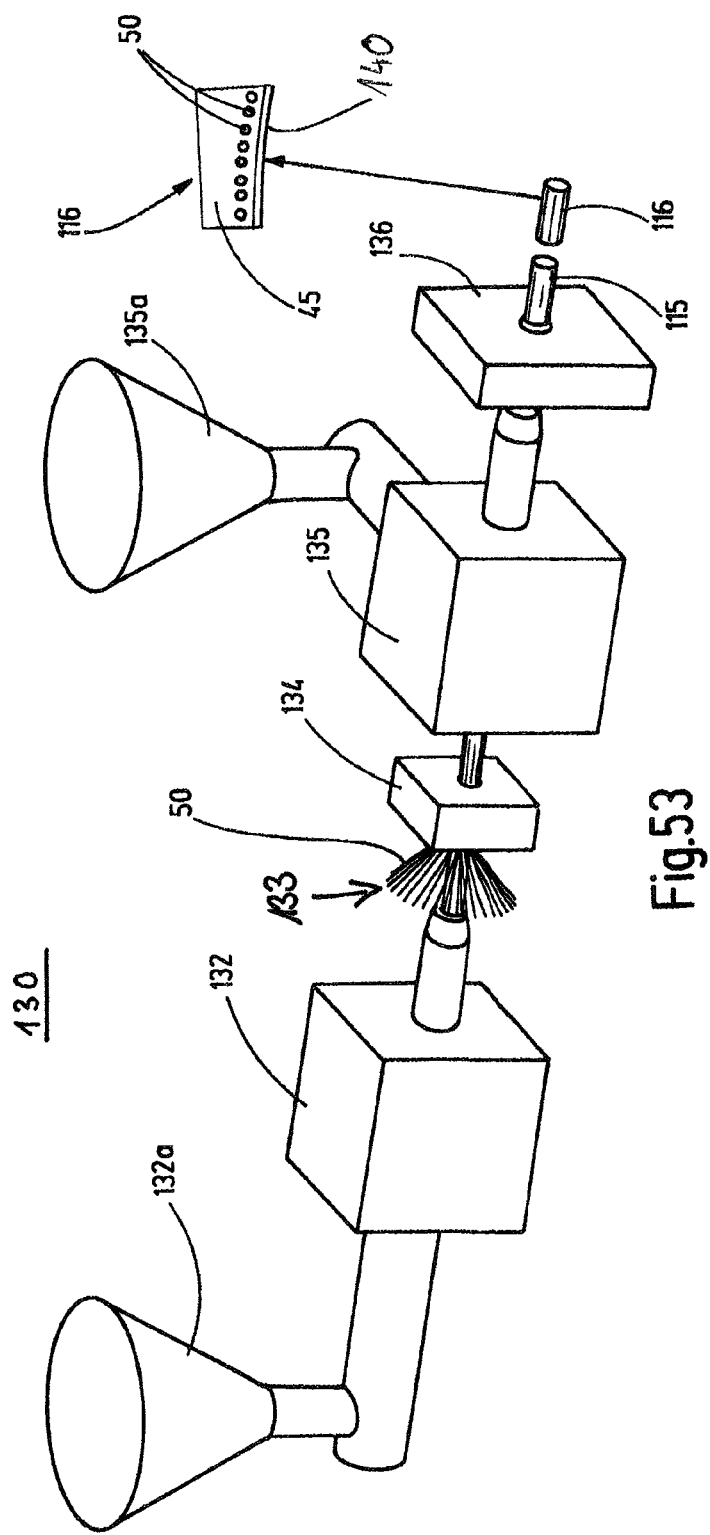

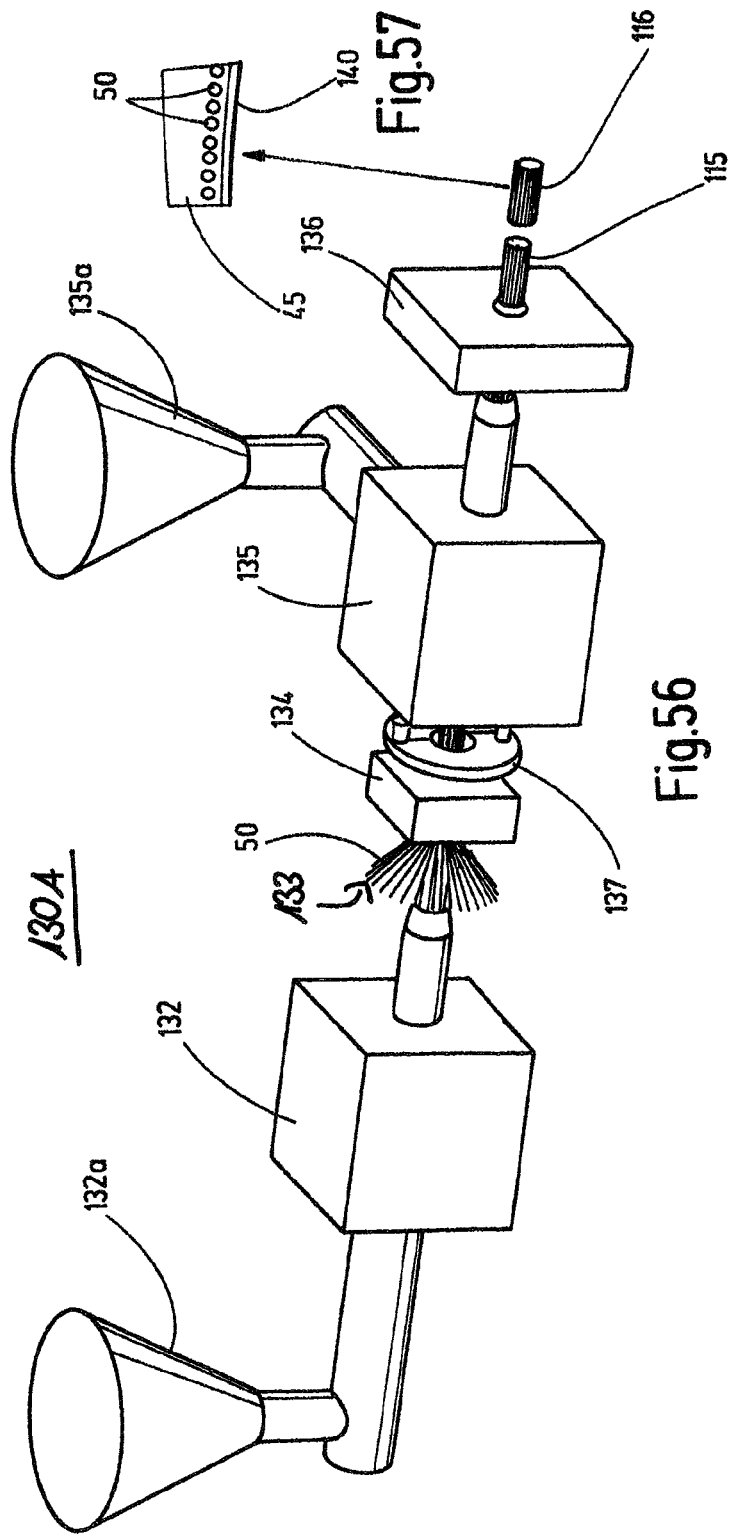

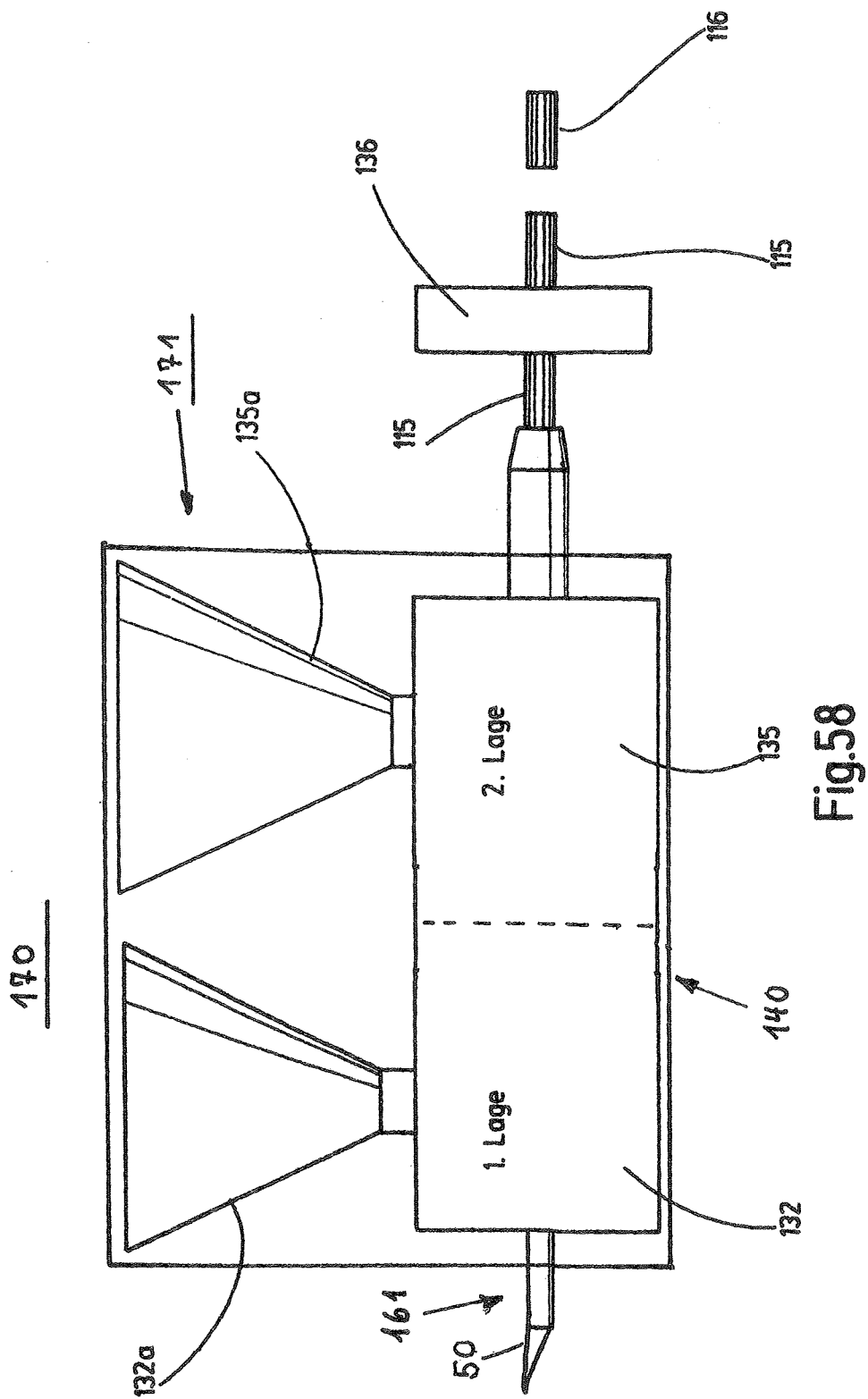

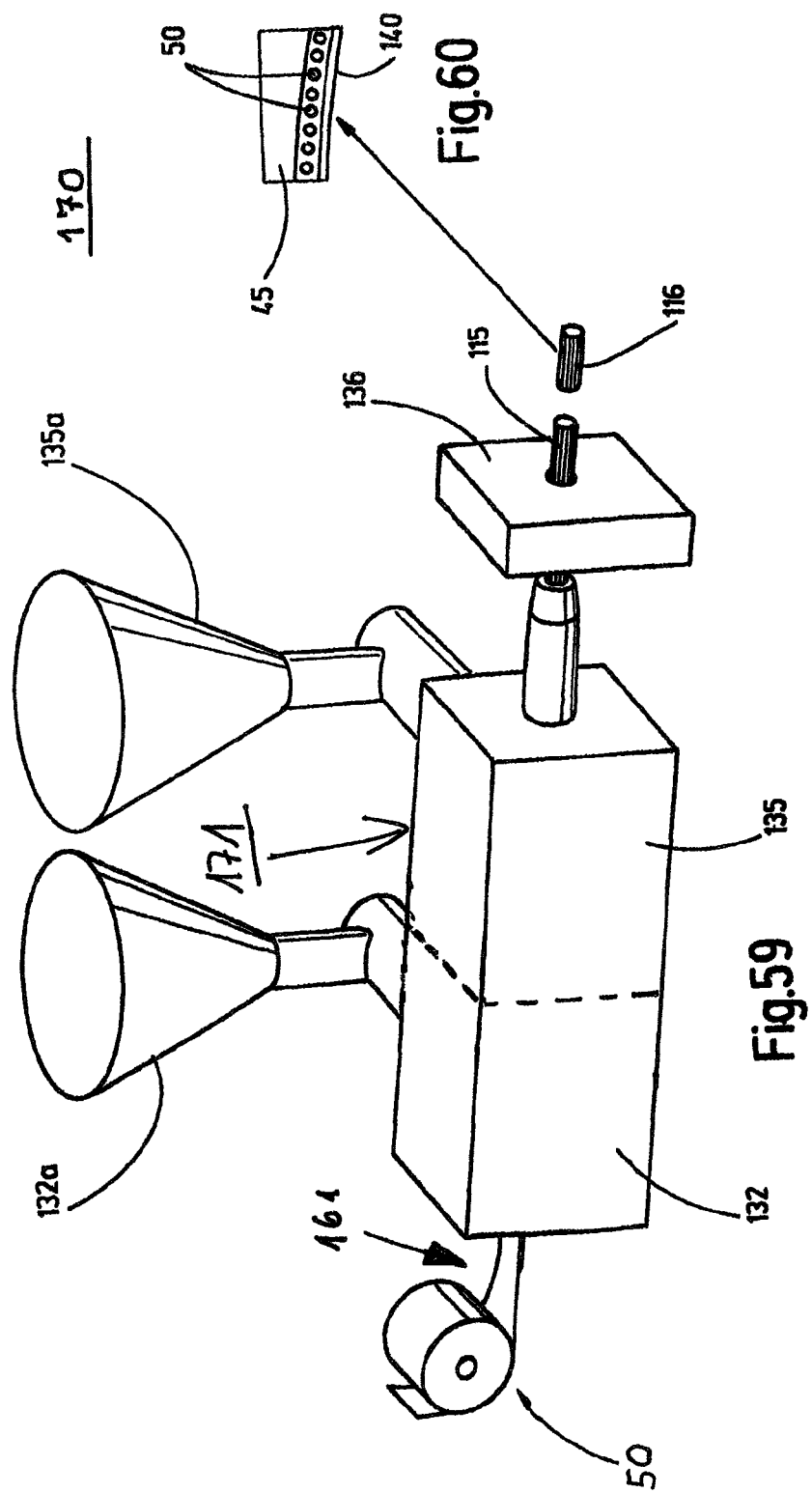

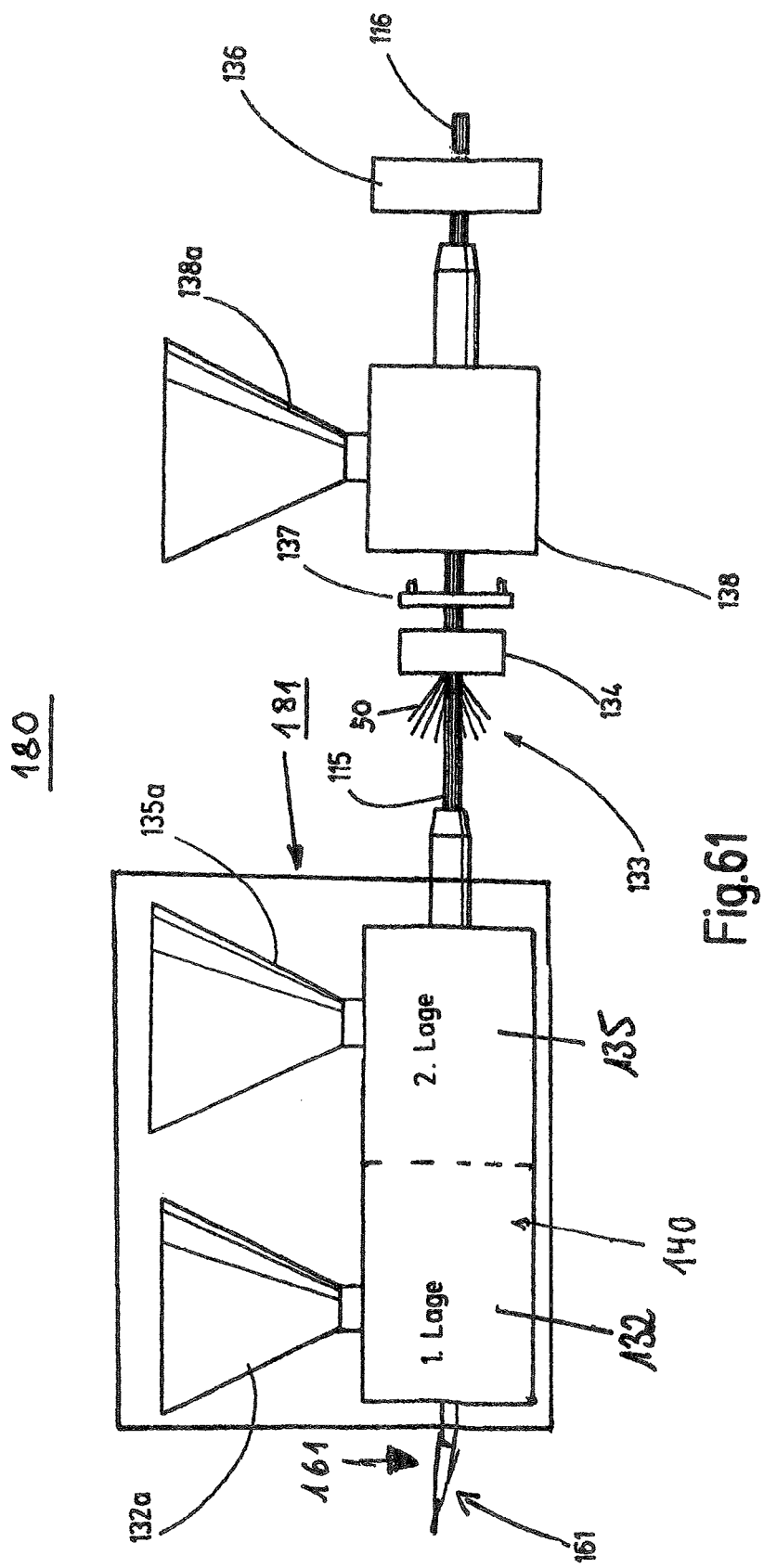

FLEXIBLE TUBULAR MOLDED BODY, SUCH AS BELLOWS, AND METHOD FOR THE MANUFACTURE THEREOF

CROSS REFERENCE TO RELATED APPLICATIONS

This application claims the priority of European Patent Application No. 12178108.2 filed Jul. 26, 2012, the disclosure of which is incorporated herein by reference in its entirety.

FIELD OF THE INVENTION

The invention relates to a flexible, tubular molded body such as bellows, for air intake, turbo charging, cooling water and oil circuits and climatisation for use in vehicle construction, ship building, mechanical engineering and aircraft construction, having at least one fabric insert as a pressure body which is embedded in a vulcanizable material, in an elastomer (natural rubber, synthetic rubber, silicone rubber) or in a thermoplastic.

BACKGROUND OF THE INVENTION

Such flexible hoses are known. DE 20 2004 018 301 U1 discloses a flexible hose, preferably charge air hose, having a wall comprising an elastomeric material at least in sections, in which a pressure support is arranged, which comprises a substantially thread-like or wire-like pressure support element. The pressure support element is embedded in the matrix of the wall and is movable with respect to the matrix of the wall, at least in sections of the pressure support element. This configuration is intended to provide a flexible hose having a longer lifetime compared with known hoses.

The hose which can be deduced from EP 1013979 B1, e.g. a charge air hose, has a pressure support comprising at least one fabric insert which is surrounded by a vulcanizable material. The hose further has a circumferential groove at the end. The fabric insert is encased by a silicone-containing material, where the hose has a preformed socket at each end, which has an embossing in the form of the circumferential groove. By using a woven fabric instead of a knitted fabric, a compressive strength should be achieved which should be substantially above that which can be achieved with the hitherto known hoses. The special configuration of the hose should enable easy installation during assembly of the motor.

In view of this, it is the object of the invention, avoiding a woven fabric or knitted fabric as pressure support element, to provide a flexible, tubular molded body having a high compressive strength and a high flexibility which despite these properties has a high elasticity.

SUMMARY OF THE INVENTION

The object is solved according to the invention by a flexible tubular molded body having a wall surface without or with a corrugated profile of the above mentioned type such as bellows, in such a manner that the circumferential wall surface of the molded body consists of a strength support insert or of multiple strength support inserts arranged to lie one above the other, wherein each strength support insert consists of threads or fibres or of cord filaments having a high tearing strength, which run parallel to one another and at a distance from one another in the longitudinal direction of the molded body, and/or having additional, circumferential auxiliary threads wound in a helix manner as pressure support element and/or consists of fixing threads running transversely or diagonally to/over the threads or fibres and cord filaments running in the longitudinal direction and holding the threads or fibres or cord filaments running in the longitudinal direction in position, where the threads or fibres, in particular cord filaments and the fixing surfaces are embedded in the vulcanizable material, or in an elastomer (natural rubber, synthetic rubber, silicone rubber) or in a thermoplastic, and where the molded body has a corrugated profile having trough-shaped or drawn-in molded body sections and having raised molded body sections, where annular bodies made of a metal material or of a plastic having a high hardness are disposed in the trough-shaped molded body sections if these should be required to preserve the corrugated contour under internal pressure or to increase the compressive strength of the part.

It is particularly advantageous in the embodiment according to the invention to use cord filaments as pressure support element and in particular cord filaments having a high tearing strength which run in the longitudinal direction of the molded body and are embedded in the vulcanizable material or in an elastomer or in a thermoplastic, and which are held in position by fixing threads having a low thickness and strength during the embedding. This strength support insert consisting of cord filaments running in the longitudinal direction of the molded body forms the pressure support element of the flexible hose or the tubular bellows. In addition to cord filaments, threads or fibres, made of plastics such as polyamide, polyester, polyvinylchloride, polypropylene, polyethylene, polyaramides etc, other materials such as natural fibres, glass, ceramic, carbon or metal fibres can be used, also in combination (hybrids) which should preferably have a high tearing strength. Since the strength support insert exclusively consists of cord filaments running in the hose longitudinal direction or threads or fibres running differently and not of a woven fabric consisting of weft and warp threads or a knitted fabric, in addition to a high compressive strength, a high elasticity is obtained which enables the flexible connector function of the tubular molded body or the bellows even under the influence of internal pressure and movement input from all possible directions and angular positions. Furthermore, a high compressive strength is achieved due to the arrangement of annular bodies made of a metal material or of a hard plastic material in the respectively drawn-in sections of the bellows.

Further advantageous embodiments of the invention are also described.

The bedding material for the threads or fibres and for the cord filaments running in the longitudinal direction and for the fixing threads consists of a dimensionally stable rubber-elastic elastomer (natural rubber, synthetic rubber, silicone rubber). Furthermore, the bedding material advantageously consists of a thermoplastic such as polyethylene, polypropylene, polyvinyl chloride, polystyrene, polyamide.

The threads or fibres such as the cord filaments running in the longitudinal direction have a greater thickness compared with the fixing threads since the fixing threads are not the subject of the pressure body. The fixing threads also do not have a high tearing strength.

The fixing threads holding the threads or fibres as well as the cord filaments of the strength support insert running in the longitudinal direction, at a distance and in position, are guided in the manner of warp threads of a fabric consisting of weft and warp threads around and over the threads or fibres, in particular over the cord filaments, where they do not fulfil the classical purpose of weft threads. The fixing threads are preferably arranged at greater distances since these exclusively have the task of fixing the cord filaments in their arrangements.

The tubular molded body acquires its corrugated shape to form a bellows by means of a molding tool consisting of an inner core tool about which a press bandage, pressing film or only excess pressure is applied above the wall material to be molded, or of an upper/outer raisable and lowerable tool and a lower/inner fixed or raisable/to be opened and lowerable tool, where the upper/outer tool and the lower/inner tool are configured with shaping surfaces corresponding to the shape of the molded body to be produced in such a manner that the shaping surfaces complement each other to the shape of the corrugated molded body to be produced.

According to a further embodiment of the invention, a configuration of the molded body is provided whereby a strength support insert consisting of threads or fibres such as cord filaments running in the longitudinal direction of the molded body and consisting of transversely running fixing threads is disposed in the circumferential wall surface of the molded body, where the threads or fibres or cord filaments and the fixing threads are embedded in the thermoplastic. The strength support insert only has threads or fibres or cord filaments running in the longitudinal direction to the molded body.

A further embodiment provides that multiple strength support inserts comprising threads or fibres such as cord filaments running in the longitudinal direction of the molded body and transversely running fixing surfaces are provided in the circumferential wall of the molded body, where the strength support inserts are arranged one above the other in such a manner that the threads or fibres such as cord filaments of the respectively uppermost strength support insert running in the longitudinal direction of the molded body come to lie above the threads or fibres, in particular cord filaments of the respective strength support insert lying thereunder or that the threads or fibres such as cord filaments of the respectively uppermost strength support insert running in the longitudinal direction of the molded body are arranged offset over the threads or fibres such as cord filaments, so that the threads or fibres such as cord filaments of the respectively uppermost strength support insert come to lie above the intermediate spaces as far as possible between the threads or fibres such as cord filaments of the respective strength support insert lying thereunder.

These embodiments contribute to a substantial increase in the tearing strength with comparatively low and homogeneous wall thickness. In addition, tubular molded bodies or bellows configured in such a manner are also suitable for high pressures. In particular, the cord filaments inserted here give the tubular molded body or the bellows a high strength whilst at the same time preserving a sufficient elasticity and flexibility.

The invention further provides a method for producing a flexible tubular molded body, like a bellows, for air intake, turbo charging, cooling water and oil circuits and air conditioning, for use in vehicle construction, ship building, mechanical engineering and aircraft construction, having at least one strength support insert which is embedded in a vulcanizable material, in an elastomer or in a thermoplastic, comprising the following steps:

a) producing a surface structure by embedding a strength support insert or multiple of superposed strength support inserts comprising threads or fibres, also core filaments running parallel to one another and at a distance from one another in the longitudinal direction to the axis of a cylindrical core tool having a corrugated profile on the outer side and/or with additional circumferential threads wound in a helix manner and comprising fixing threads running transversely or diagonally to the threads or fibres or cord filaments running in the longitudinal direction and holding these in position in a vulcanizable material or in an elastomer or in a thermoplastic, where a section of the surface structure is applied to a cylindrical or hollow cylindrical core tool having a corrugated profile on the outer side and is deformed by means of a molding tool or press bandage, pressing film or excess pressure (autoclave) to form a bellows or a1) producing, in an extrusion process, a tubular and strand-like molded body comprising one or more superposed strength support inserts embedded in a vulcanizable material or in an elastomer or in a thermoplastic comprising threads or fibres, also core filaments running in the longitudinal direction of the strand and at a distance from one another and/or with additional circumferential auxiliary threads wound in a helix manner and comprising fixing threads running transversely or diagonally to the threads or fibres or cord filaments running in the longitudinal direction and holding these in position and shaping the corrugated profile of individual strand sections by means of sliding onto suitably shaped molding tools or shaped hoses to produce individual bellows.

The method according to the invention for producing a flexible tubular molded body such as a bellows for air intake, turbo charging, cooling water and oil circuits and air conditioning, for use in vehicle construction, ship building, mechanical engineering and aircraft construction, having at least one strength support insert which is embedded in a vulcanizable material, in an elastomer or in a thermoplastic, comprises the following steps:

a2) producing a surface structure by embedding a strength support insert or multiple of superposed strength support inserts comprising threads or fibres, also core filaments running parallel to one another and at a distance from one another in the longitudinal direction to the axis of a cylindrical core tool having a corrugated profile on the outer side and/or additional circumferential auxiliary threads wound in a helix manner and comprising fixing threads running transversely or diagonally to the threads or fibres or cord filaments running in the longitudinal direction and holding these in position in a vulcanizable material or in an elastomer or in a thermoplastic;

b) forming a roll from the surface structure produced in step a);

c) winding a section separated from the rolled-up surface structure onto a cylindrical or hollow cylindrical core tool having a corrugated profile on the outer side;

d) action of the upper/outer tool and of the lower/inner tool of a molding tool having an upper/outer mould having a shape correspond to the shape of the molded body to be produced having the corrugated profile and having a lower/inner mould having a shape corresponding to the shape of the molded body to be produced having the corrugated profile, wherein the molds of the upper/outer mold and of the lower/inner mold complement each other to form the corrugated shape of the molded body, on the section of the surface structure arranged on the cylindrical core tool to form the bellows;

optionally and/or d1) action of a press bandage, pressing film, excess pressure (autoclave), downward-movable pressing rollers or round profiles which are put in place before bringing up the press bandage, pressing film etc in order to improve the shaping; and/or d2) expansion by internal pressing of the preform/blank by means of a balloon (bladder) or by direct blowing in of air or steam instead of the core tool to the inner contour of the closed upper/lower tool
e) removing the cylindrical inner tool or the tool halves to release the bellows;
f) optionally inserting ring members made of a metal material into the troughs formed in the bellows.

The invention also comprises an embodiment whereby strength support inserts are inserted which exclusively comprise threads or fibres or cord filaments embedded in the bedding material, running in the longitudinal direction to the molded body, where the arrangement of the strength support inserts can be single-layer or multilayer.

In addition to the method of manufacture for the bellows, where a strip-shaped surface structure consisting of threads or fibres or cord filaments embedded in a thermoplastic as pressure support element and fixing threads holding these in position, is assumed, where individual sections of the surface structure are then deformed into a bellows, the invention provides another method of manufacture where tubular and strand-shaped sections of a blank produced by means of an extrusion system are deformed into individual bellows.

This method for producing a flexible tubular molded body, having a wall surface without or with a corrugated profile such as bellows for air intake, turbo charging, cooling water and oil circuits and air conditioning, for use in vehicle construction, ship building, mechanical engineering and aircraft construction, having at least one strength support insert which is embedded in a vulcanizable material, in an elastomer or in a thermoplastic, using an extrusion system comprising a first extruder, a feed device for the threads or for the core filaments, a device for fixing the threads or the cord filaments, possibly a device for applying flyer threads (helical circulating winding), a second extruder and a device for cutting to length individual sections of a strand-shaped endless blank to form individual blank sections, comprises the following steps:
a) producing a strand-shaped tubular molded body having a circumferential wall without or with a corrugated profile by means of an extrusion system for elastomers or thermoplastic by shaping a strand-shaped tubular blank by means of a first extruder;
b) feeding threads or cord filaments running in the longitudinal direction of the strand-shaped blank for depositing on the surface of the blank;
b1) feeding the longitudinal-lying threads, fibres or cord filaments, their position and distance possibly fixed with light transverse threads, as flat material by front-side pulling into a double-T co-extruder, where the flat-lying strength support is formed round inside the co-extruder above the first extrusion on the outer surface of this inner core and is then oversprayed with a cover layer by the second extruder mouth;
c) fixing the threads or cord filaments deposited on the strand-shaped blank by means of supplied fixing threads (helix flyers); (not in case of b1))
d) applying another layer or an elastomer or thermoplastic by means of a second extruder on the strand-shaped blank produced in step c);
e) arbitrarily repeating steps a), b), b1), c) and d) to produce several layers with strength supports;
f) cutting to length individual blank sections from the blank produced in step d); possibly,
f1) action of a press bandage, pressing film, excess pressure (autoclave), downward-movable pressing rollers or round profiles which are put in place before bringing up the press bandage, pressing film etc in order to improve the shaping
f2) expansion by internal pressing of the preform/blank by means of balloon (bladder) or by direct blowing in of air or steam instead of the core tool to the inner contour of the closed upper/lower tool
g) deforming the individual blank sections obtained in step e) to form a bellows using a molding tool which produces the corrugated profile having an upper/outer mold having a shape corresponding to the shape of the molded body to be produced with the corrugated profile and having a lower/inner mold corresponding to the shape of the molded body to be produced with the corrugated profile, wherein the shapes of the upper mold and the lower mold complement each other to form the corrugated shape of the molded body or the shaping is accomplished by external pressure by means of press bandage, pressing film or excess pressure (autoclave).

The present invention comprises various methods for producing a flexible, tubular molded body. Molded bodies whose circumferential wall surfaces are unprofiled or configured with a corrugated profile are, therefore, provided. Both embodiments have at least one strength support insert consisting of threads or fibres or cord filaments running parallel to one another in the molded body longitudinal direction and of fixing surfaces running transversely or longitudinally running threads or fibres or cord filaments which hold these threads in position, which is embedded in an elastomer or thermoplastic.

Additionally interposed woven fabrics as further strength supports possibly increase the overall strength.

The flexible tubular molded body according to a further embodiment of the invention comprises an unprofiled circumferential wall which is formed by at least one strength support insert embedded in a thermoplastic material or elastomer consisting of threads, fibres or cord filaments running in the longitudinal direction of the molded body and of fixing threads which hold the threads at a distance and in position, which run transversely or diagonally to the threads and can be omitted.

The invention further relates to a method for producing a flexible tubular molded body, having a wall surface without or with a corrugated profile such as bellows, molded hose, molded arcs for air intake, turbo charging, cooling water and oil circuits and air conditioning, for use in vehicle construction, ship building, mechanical engineering and aircraft construction, having at least one strength support insert which is embedded in a vulcanizable material, in an elastomer or in a thermoplastic, using an extrusion system comprising a T-co-extruder, with front-side feed for the threads or for the core filaments as web-shaped flat material, which is shaped round above the first extrusion core in the extruder head over this first core and then over molded by the second extruder nozzle. This system can stand alone, either then followed by a cutting to length device or, for producing further layers of strength supports, followed by a feed device for the threads or the core filaments, followed by a device for fixing the threads or the core filaments, possibly a device for applying flyer threads, a second extruder and a device for cutting to length individual sections of a strand-shaped endless blank to form individual blank sections, comprising the following steps:
a) producing a strand-shaped tubular molded body having a circumferential wall without or with a corrugated profile by means of an extrusion system by shaping a strand-shaped tubular inner core by means of a first extruder;

b) feeding threads or cord filaments running in the longitudinal direction of the blank for depositing on the surface of the blank;
c) fixing the threads or cord filaments deposited on the strand-shaped blank by means of supplied fixing threads;
d) applying a layer or several further layers of an elastomer or thermoplastic by means of a second or further extruders on the strand-shaped blank produced in step c);
e) cutting to length individual blank sections from the blank produced in step d);
f) deforming the individual blank sections obtained in step e) to form a bellows using a molding tool which produces the corrugated profile having an upper mold having a shape corresponding to the shape of the molded body to be produced with the corrugated profile and having a lower mold with a copy to, wherein the shapes of the upper mold and the lower mold complement each other to form the corrugated shape of the molded body; and/or
f1) Action of a press bandage, pressing film, excess pressure (autoclave), downward-movable pressing rollers or round profiles which are put in place before bringing up the press bandage, pressing film etc in order to improve the shaping; and/or
f2) expansion by internal pressing of the preform/blank by means of balloon (bladder) or by direct blowing in of air or steam instead of the core tool to the inner contour of the closed upper/lower tool

BRIEF DESCRIPTION OF THE DRAWINGS

Exemplary embodiments of the subject matter of the invention are shown as an example in the drawings where:

FIG. 3 shows, in a diagrammatic view, an inner liner prepared as roll material;
FIG. 4 shows, in a diagrammatic view, a section of the inner liner before application to a cylindrical core tool having a corrugated profile;
FIG. 5 shows, in a diagrammatic view, the cylindrical core tool with a surface having a corrugated profile with applied inner liner;
FIG. 6 shows, in a diagrammatic view, a rolled up strength support insert of core filaments and fixing threads;
FIG. 7 shows, in a diagrammatic view, a section of the strength support insert before application to the cylindrical core tool provided with the inner line;
FIG. 8 shows, in a diagrammatic view, the cylindrical core tool with applied inner line and with applied strength support insert;
FIG. 9 shows, in a diagrammatic view, a detail of the structure of the layers on the cylindrical core tool—cord filaments in longitudinal direction of the central axis;
FIG. 11 shows, in a diagrammatic view, the core tool with the bellows before the demolding;
FIG. 12 shows, in a diagrammatic view, the bellows after the demolding;
FIG. 13 shows, in a diagrammatic view, the finish-assembled bellows;
FIG. 14 shows, in a diagrammatic view, a core tool provided with a corrugated profile and a cylindrical blank consisting of the completely prefabricated wall structure, with at least one strength support insert with cord filaments running in the longitudinal direction and fixing threads;
FIG. 15 shows, in a diagrammatic view, the blank pushed onto the core tool;
FIG. 16 shows, in a diagrammatic view, the bellows after the further processing before the demolding;
FIG. 19 shows, in a diagrammatic view, a section of the tubular molded body with a strength support insert with cord filaments running in the axial direction;
FIG. 20 shows, in an enlarged view, a wall section of the tubular molded body with the cord filaments embedded in an elastomer or thermoplastic;
FIG. 21 shows, in an enlarged diagrammatic view, a wall section of the tubular molded body with a row of adjacently disposed cord filaments;
FIG. 22 shows, in a diagrammatic view, a section of the tubular molded body with a strength support insert with cord filaments held in position in the longitudinal direction by two rows of fixing threads;
FIG. 23 shows, in an enlarged view, a wall section of the tubular molded body with the cord filaments arranged in a row;
FIG. 24 shows in an enlarged diagrammatic view, a wall section of the molded body with a row of cord filaments embedded in an elastomer or thermoplastic and held in position by two rows of fixing surfaces;
FIG. 25 shows, in a diagrammatic view, a section of the tubular molded body with two strength support inserts arranged to lie one above the other with cord filaments running in the axial longitudinal direction;
FIG. 26 shows, in an enlarged view a wall section of the tubular molded body with the cord filaments of the two strength support inserts arranged to lie one above the other;
FIG. 27 shows, in an enlarged diagrammatic view, a wall section of the tubular molded body with two superposed rows of cord filaments embedded in an elastomer or thermoplastic;
FIG. 28 shows, in a diagrammatic view, a section of the tubular molded body with two strength support inserts arranged to lie one above the other with cord filaments running in the axial longitudinal direction, held in position by fixing threads;
FIG. 29 shows, in an enlarged view, a wall section of the tubular molded body with the cord filaments of the two strength support inserts arranged to lie one above the other;
FIG. 30 shows, in an enlarged diagrammatic view, a wall section of the tubular molded body with two superposed rows of cord filaments embedded in an elastomer or thermoplastic and held in position by fixing threads;
FIG. 31 shows, in a diagrammatic view, an inner liner drawn from the roll and wound in one layer with/without covering on a cylindrical core tool provided with a corrugated profile;
FIG. 32 shows, in a diagrammatic view, a cylindrical core tool provided with a corrugated profile;
FIG. 33 shows, in a diagrammatic view, the cylindrical core tool according to FIG. 31 with partially wound-on section of an inner liner strip;
FIG. 34 shows, in a diagrammatic view, a strength support drawn from the roll, precoated with elastomer or thermoplastic and strength support wound in one layer with/without covering on the cylindrical core tool;

FIG. 35 shows, in a diagrammatic view, the cylindrical core tool according to FIG. 31 with wound-on section of inner liner strip;

FIG. 36 shows in a diagrammatic view, the cylindrical core tool with wound-on inner liner and with partially wound on strength support insert;

FIG. 37 shows in a diagrammatic view, the cylindrical core tool provided with a corrugated profile and the prefabricated blank before sliding on to the core tool;

FIG. 38 shows a detail of the layer structure of the blank;

FIG. 39 shows in a diagrammatic view, the cylindrical core tool with pushed-on blank;

FIG. 40 shows in a diagrammatic view, the cylindrical core tool with pushed-on blank with a row of cord filaments running in the axial longitudinal direction;

FIG. 41 shows a detail of the layer structure of the blank;

FIG. 42 shows in a diagrammatic view, the blank pushed on to the cylindrical core tool in combination with a profile roller placed on the circumference of the core tool to form the corrugated profile and the bellows;

FIG. 43 shows in a diagrammatic view, the bellows partially formed on the cylindrical core tool with the rollers producing the corrugated profile;

FIG. 44 shows in a diagrammatic view, another embodiment of a profile roller with corrugation extending almost over the entire length of the blank;

FIG. 45 shows in a diagrammatic view, a cylindrical core tool with pushed-on blank and with elastic rings placed thereon for fixing the outer contour;

FIG. 46 shows in a diagrammatic view, the bellows formed on the cylindrical core tool with the incoming press bandage which produces the corrugated profile whilst simultaneously fixing the contour before the vulcanization;

FIG. 47 shows in a diagrammatic view, the bellows arranged and formed on the cylindrical core tool after vulcanization with the press bandage removed and with contour rings before trimming;

FIG. 48 shows in a diagrammatic view, the trimmed bellows;

FIG. 53 shows in a diagrammatic view, an extrusion system for producing molded body blanks comprising a first extruder, a device for supplying cord filaments, a device for thread fixing, a second extruder and a device for cutting the blanks to length;

FIG. 54 shows a wall section of a blank produced with the extrusion system having an inner liner and having a row of cord filaments embedded in an elastomer or thermoplastic;

FIG. 56 shows in a diagrammatic view, an extrusion system for producing strand-shaped molded body blanks comprising a first extruder, a device for supplying cord filaments, a device for thread fixing, a device for applying flyer threads, a second extruder and a device for cutting the blanks to length;

FIG. 57 shows a wall section of a blank produced with the extrusion system having an inner liner and a row of cord filaments embedded in an elastomer or thermoplastic;

FIG. 58 is a side view of a T-co-extrusion system comprising a T-co-extruder, a device for supplying a layer of flat web of cord filaments on the front side and a device for cutting blank sections to length from the endless blank;

FIG. 59 shows a diagrammatic view of the T-co-extrusion system according to FIG. 58;

FIG. 60 shows an enlarged view of a section of the blank with a detail of its layer structure;

FIG. 61 shows a side view of a T-co-extrusion system with a T-co-extruder, another extruder, a device for applying flyer threads and a device for cutting blank sections to length from the continuous blank;

DESCRIPTION OF THE PREFERRED EMBODIMENTS

Figure 1:
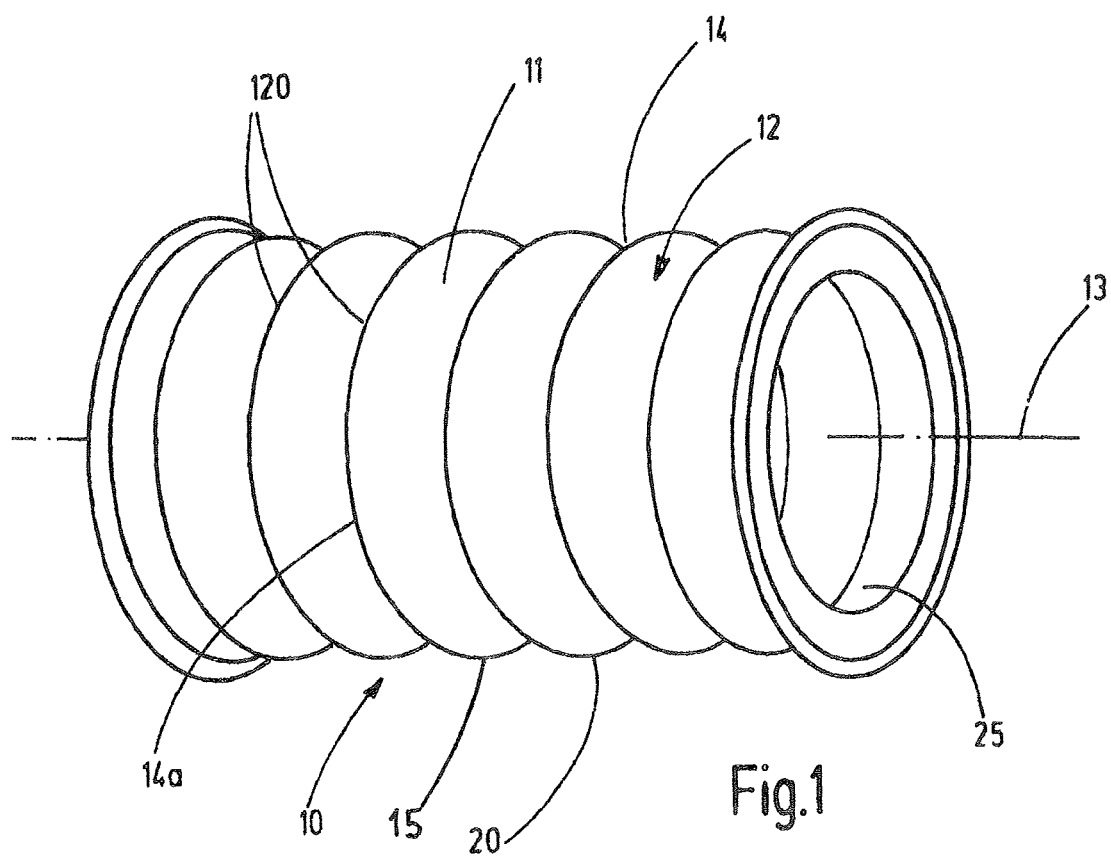
FIG. 1 shows a bellows in a diagrammatic view.

FIG. 1 shows an exemplary embodiment of the invention. The flexible tubular molded body 10 is configured as bellows 20. Its circumferential wall surface 11 has a corrugated profile 12 with drawn-in wave troughs 14a and raised molded body sections 15, the longitudinal axis of the bellows 20 is designated by 13. On the inner wall side an inner liner 140 made of a plastic, of an elastomer or thermoplastic is provided. The circumferential wall surface 11 of the bellows 20 is formed by at least one strength support insert 30 embedded in a vulcanizable material or in an elastomer or in a thermoplastic 40 (FIGS. 29 and 30) or by a multiple of strength support inserts 30, 30' arranged to lie one above the other (FIGS. 23, 34 and 26, 27).

Each strength support insert 30, 30a consists of threads or fibres, in particular cord filaments 50, running in the longitudinal direction of the molded body 10, where advantageously threads, fibres, also so-called cord filaments 50 having a high tearing strength are used.

The cord filaments 50 of the strength support insert 30 form the pressure support element. Plastic fibres, fibres made of metal, glass, ceramic, carbon fibre and natural fibres can be used to produce the pressure support element. The cord filaments 50 lying in a row next to one another and at a distance from one another are embedded in an elastomer or thermoplastic 40. Differently formed bedding material can also be used. As FIG. 21 shows, the cord filaments 50 arranged in a row are not interconnected.

According to a further embodiment, the cord filaments 50 are held in position by means of fixing threads 60 which together with the cord filaments 50 are embedded in a thermoplastic (FIGS. 24 and 30). Accordingly the strength support insert 30 consists of cord filaments 50 running in the longitudinal direction and fixing threads 60 running transversely or diagonally to these, which consist of plastic or natural fibres and do not have a high tearing strength since only the cord filaments 50 form the pressure support element.

Figure 2:
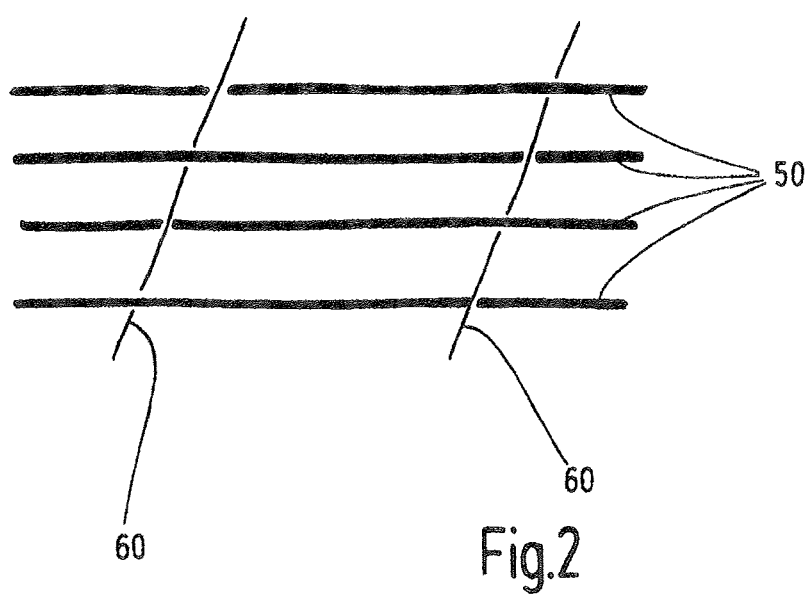
FIG. 2 shows a plan view of a fabric insert comprising cord filaments running in the longitudinal direction with fixing threads running transversely thereto, which hold the cord filaments in position.

The threads or fibres or cord filaments 50 running in the longitudinal direction are held at a distance and in position by the fixing threads 60. the fixing threads 60 are guided in the manner of weft threads of a woven fabric consisting of weft and warp threads around and over the threads or fibres or cord filaments 50 (FIG. 2). The fixing threads 60 are arranged in a multiple of rows (FIGS. 24 and 30). The fixing threads 60 of the individual rows 61, 61 are guided in such a manner over the cord filaments that in a first row 61 the fixing threads 60 are guided over the cord filaments 50 whereas in the respectively following row 62, the fixing surfaces 60 are guided over the cord filaments 50 in such a manner that the guide areas are offset to one another as can be seen from FIGS. 24 and 30.

The fixing threads 60 of the two rows 61, 62 are guided over and under the cord filaments 50 in such a manner that the sections of the fixing threads 60 of the two rows 61, 62 overlapping the cord filaments 50 are offset with respect to one another as shown in FIGS. 24 and 30. This is continued alternately over the width of the strength support insert material.

Since it is exclusively the object of the fixing threads 60 to hold the cord filaments 50 at a distance and in position, the fixing threads 60 have a small thickness compared with the thickness of the cord filaments 50 (FIGS. 24 and 30).

If the wall 11 of the molded body 10 is formed by a multiple of strength support inserts 30, 30', the strength support inserts are then arranged in such a manner one above the other that the threads or fibres or cord filaments 50 of the respectively uppermost strength support insert 30, running in the longitudinal direction of the molded body 10 come to lie above the threads or fibres or cord fibres 50 of the strength support insert 30' lying thereunder (FIGS. 26, 27 and 29, 30).

According to a further embodiment, the threads or fibres or cord filaments 50 of the respectively uppermost strength support insert 30, running in the longitudinal direction of the moulded body 10 are arranged offset below the threads or fibres or cord filaments 50 of the respectively lowermost strength support insert 30' so that the threads or fibres or cord filaments 50 of the respectively uppermost strength support insert 30 ideally come to rest above the intermediate spaces between the threads or fibres or cord filaments 50 of the strength support insert 30 lying thereunder.

In order to increase the strength of the bellows 20, annular bodies made of a metal material or of a plastic having a high hardness are arranged in the trough-shaped molded body sections (FIG. 1).

The task of the annular bodies 70 consists in preventing the expansion of wall body sections of the molded body due to the occurrence of a higher internal pressure and therefore in addition to the compressive strength, primarily the mold contour (also corrugations) is preserved and thus the flexibility and elasticity according to the object of the invention for absorbing movement under pressure is also preserved (FIG. 30).

The same task as is fulfilled by the annular bodies is fulfilled by the auxiliary threads embedded in the material of the molded body, which are coiled or wound in the manner of a helix which is a curve wound with constant pitch, where this can be right-handed or left-handed. A thread guidance in the manner of a double helix is also possible.

The bedding material 45 (FIG. 20) for the cord filaments 50 and for the fixing threads consists of a dimensionally stable rubber-elastic elastomer. The bedding material 45 can further consist of a thermoplastic such as polyethylene, polypropylene, polyvinylchloride, polystyrene or polyamide.

Figure 10:
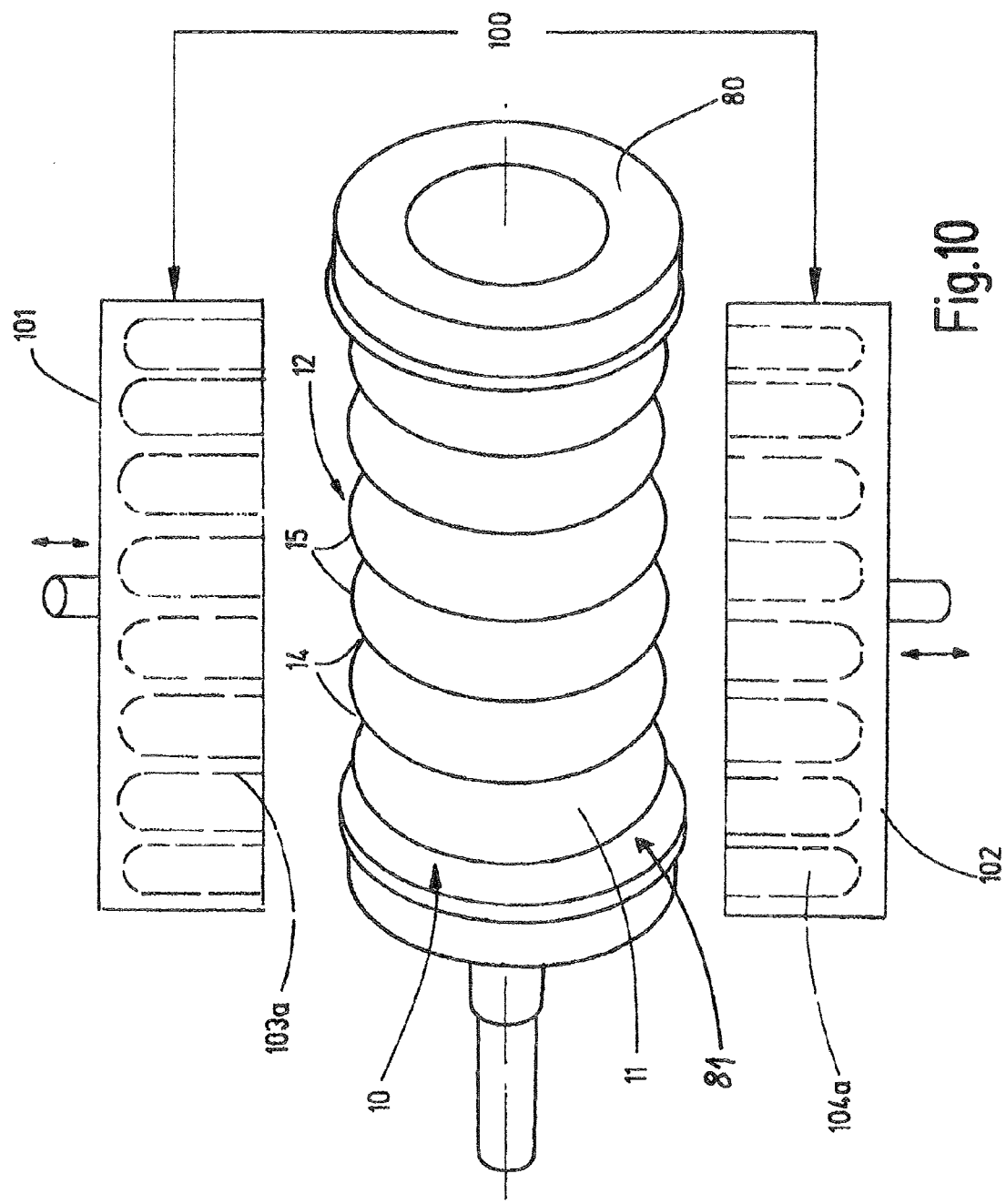
FIG. 10 shows, in a diagrammatic view, the bellows formed on the cylindrical core tool with the molding tool producing the corrugated profile in open position.

The molded body 10 acquires its corrugated shape to form the bellows 20 by means of a molded tool 100 consisting of an upper raisable and lowerable tool 101 and a lower fixed or raisable and lowerable tool 102, where the upper tool 101 and the lower tool 102 having surfaces 103a, 104a shaping the shape of the molded body 10 or bellows 20 to be produced in such a manner that the shaping surfaces 103a, 104a complement each other to the shape of the molded body 10 or bellows 20 to be produced (FIG. 10). In this embodiment, a cylindrical core tool 80 having a corrugated profile 81 formed on its circumferential wall surface acts so that the shaping surfaces 103a, 104a which are also configured to be corrugated-profile like, and the corrugated profile 81 of the cylindrical core tool 80 complement each other so that a bellows 20 can be produced (FIGS. 1 and 10). Instead of the core tool 80, an inwardly pressed balloon or pure introduced internal pressure (including vapour) can be used, by which means the blank is pressed into the shape of the two outer tool halves and held over the vulcanization/cross-linking time of the elastomer.

The bellows 20 is fabricated according to the following exemplary embodiment;

Firstly a strip-shaped inner line 140 is made from a plastic material (FIG. 3). The inner liner strip wound to form a roll 145 is divided into individual strip sections 141a. Each strip section 141 has a length which corresponds to the circumference of a cylindrical or hollow cylindrical core tool 80 (FIG. 4). This strip section 140a is wound onto the cylindrical core tool 80 (FIG. 5).

As a next step a surface structure 90 is formed by embedding in an elastomer or thermoplastic a strength support insert 30 or multiple strength support inserts 30, 30' made of core filaments 50 running parallel and at a distance in the longitudinal direction to the axis 82 of the cylindrical core tool 80 having a surface with a corrugated profile 83 and of fixing threads 60 running transversely or diagonal to the core filaments 50 running in the longitudinal direction. This surface structure is produced in strip shape and wound into a roll (FIG. 6). Then a section 96 of the strip-shaped surface structure 90 is separated (FIG. 7). The length of the separated section 96 corresponds to the surface of the cylindrical core tool 80. This section 96 is then wound onto the cylindrical core tool 80 and comes to lie on the inner liner 140 which is already arranged on the core tool 80 (FIG. 8). A detail of the layer structure is shown in FIG. 9.

The one or more strength support inserts 30, 30' together with the inner liner 140 and the other elastomer or thermoplastic beddings are then deformed with the molding tool 100 and specifically to form the corrugated profile 12 (FIG. 10).

FIG. 11 shows the cylindrical core tool 80 and the bellows 20 with the corrugated profile 12 before demolding. The cylindrical core tool 80 is then removed and the bellows 20 exposed (FIG. 12). This is followed by assembly to form the finished bellows 20 (FIG. 13).

Figure 17:
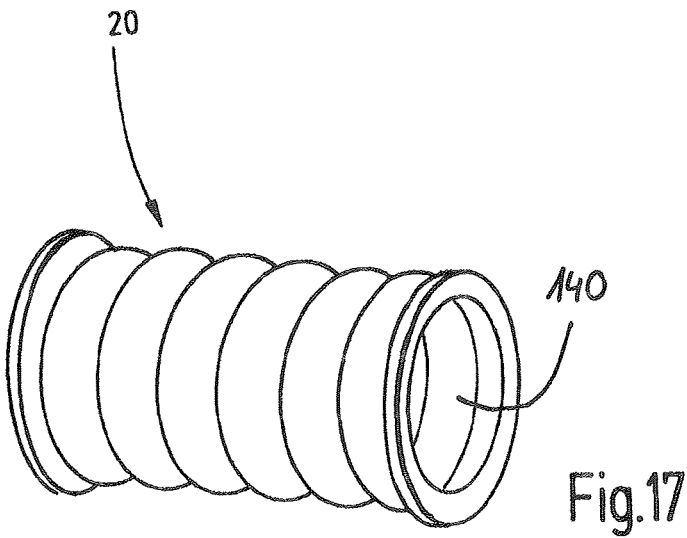
FIG. 17 shows, in a diagrammatic view, the bellows after the demolding.
Figure 18:
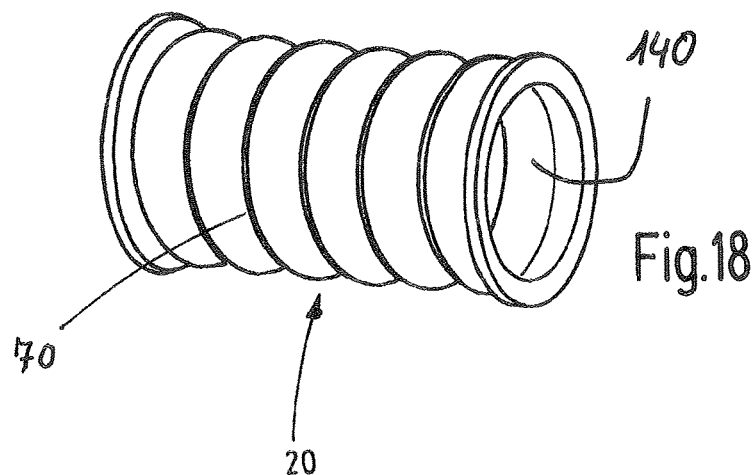
FIG. 18 shows, in a diagrammatic view, the finish-assembled bellows.

A further fabrication of a bellows 20 is shown in FIGS. 14 to 16. In this method of manufacture a cylindrical blank 10a is taken as the starting point, which consists of a surface structure of cord filaments 50 and fixing threads 60 embedded in an elastomer or thermoplastic or in the case of an extruded blank of applied longitudinal threads and can be provided with an inner liner 140. A cylindrical core tool 80 having a surface formed with a corrugated profile 81 is then inserted into this cylindrical blank 10a (FIG. 14). The blanks 10a sits in a precisely fitting manner on the cylindrical core tool 80 (FIG. 15). The corrugated profile shaping is then undertaken by means of a correspondingly shaped molding tool 100 or feeding press bandage, pressing film possibly with round profile bodies placed thereunder or excess pressure (autoclave) or downward-movable contour rollers. FIG. 16 shows the shaped bellows 20 before demolding. The cylindrical core tool 80 is then removed and after demolding (FIG. 17) the ready-assembled bellows 20 is then obtained (FIG. 18).

FIGS. 19, 20 and 21 show the structure of a molded body 10. This molded body consists of a strength support insert 30 which in addition to an inner liner 140 comprises number of cord filaments 50 running in the longitudinal direction (FIG. 21). These cord filaments are not held in position by means of fixing threads 60 but are embedded in an elastomer or thermoplastic 40 (FIGS. 19 and 20). The blank 115 is obtained by extrusion.

The structure of the blank 115 according to FIGS. 22, 23 and 24 comprises only one strength support insert 30 made of cord filaments 50 which are held in position by means of two rows of fixing threads 60. The fixing threads 60 are arranged in two rows 61, 62 (FIG. 24). This arrangement is repeated at a certain distance appropriate to the degree of fixing. The cord filaments 50 and the fixing threads 60 are embedded in an elastomer or thermoplastic 40.

Another embodiment of a structure is shown in FIGS. 25, 26 and 27.

The blank 115 obtained by extrusion, from which the bellows 20 is formed, consists of two superposed strength support inserts 30, 30' where each strength support insert has a row of cord filaments 50. The cord filaments 50 are embedded with an elastomer or thermoplastic 40 as bedding material 45 (FIGS. 26, 27). In this embodiment also the cord filaments 50 of the two strength support inserts 30, 30' are not held in position by means of fixing threads 60.

FIGS. 28, 29 and 30 show a structure for a molded body 10. Here the wall of the blank 115 consists of two strength support inserts 30, 30' where both strength support inserts have cord filaments 50 arranged in rows. The strength support insert 30 has cord filaments 50 which are held in position by means of fixing threads 60. The fixing threads 60 are arranged in two rows 61, 62, i.e. a front row 61 of fixing threads and a back row 62 of fixing threads (FIG. 30). This arrangement is repeated at a certain distance appropriate to the degree of fixing. The cord filaments 50 and the fixing threads 60 of the two strength support inserts 30, 30' are embedded in an elastomer or thermoplastic 40. This blank also has an inner liner 40 in the inner wall side.

The molded body 10 acquires its corrugated shape to form the bellows 20 by a feeding press bandage or downward-pressing rollers producing the corrugated profile or profile round bodies producing the corrugated profile and the press bandage running thereover.

The fabrication of a bellows can be deduced from FIGS. 31, 32 and 33. According to FIG. 31, a strip-shaped section 141a which subsequently forms the inner liner 140 is drawn from a roll 145 and wound in one layer with/without covering on a cylindrical core tool 80 provided with a corrugated profile 12 (FIGS. 32 and 33). The section 141a wound on the core tool 80 forms the inner liner 140 (FIG. 35). A section 96 is separated from the roll 95 (FIG. 34). The section 96 forms the strength support insert 30 and is placed on the core tool 80 already having the inner liner 140, where multiple strength support inserts 30 can also be placed one after the other. The cord filaments of the strength support insert run in the longitudinal direction of the core tool 80, the core tool 80 with wound-on inner liner 140 is shown with the partially wound-on strength support insert 30 in FIG. 36.

The blank 99 thus prepared is pushed onto the cylindrical core tool 80 having the corrugated profile 12. The layer structure of the blank 99 is shown in FIG. 38. The layer consists of a row of cord filaments 50 which are embedded in a thermoplastic 40. This bedding with the cord filaments is disposed on the inner liner 140 (FIG. 38). The blank is pushed onto the core cool 80 (FIG. 39).

The blank 99 disposed on the core tool 80 according to FIG. 40 with the layer structure reproduced in FIG. 41 (FIG. 41) now acquires its corrugated profile 12. FIG. 42 shows the blank 99 pushed onto the cylindrical core tool in conjunction with a profile roller 150 with a profile 151 placed on the circumference of the core tool, which is configured in such a manner that under the action on the surface of the blank 99 in cooperation with the corrugated surface profile of the core tool 80, the wall surface of the blank 99 acquires a corrugated profile 12. In order that a corrugated profile is obtained which extends over the entire length of the blank 99, the profile roller 150 is moved alternatively in the direction of the arrow x. The length of the blank 99 corresponds to the length of the core tool 80 (FIG. 42).

The length of the profile roller can be selected arbitrarily.

FIG. 43 shows the partially formed bellows 20 with a profile roller 150 on the cylindrical core tool 80.

Another embodiment of a profile roller 150 with corrugation extending almost over the entire length of the blank 99 is shown in FIG. 43. A corrugated profile having a short length is produced on the blank in this case. The formation of a corrugated profile 12 extending over the entire length of the blank 99 is achieved according to FIG. 44 with a correspondingly configured profile roller 150.

In one embodiment of a bellows 20 according to FIG. 45, elastic rings 160 fix the outer contour of the bellows 20.

FIG. 46 shows the bellows formed on the cylindrical core tool 80 with the incoming press bandage or pressing film 170 producing the corrugated profile 12. In this way, the contour is fixed before vulcanization by means of a pressing reel or pressing film.

Figure 49:
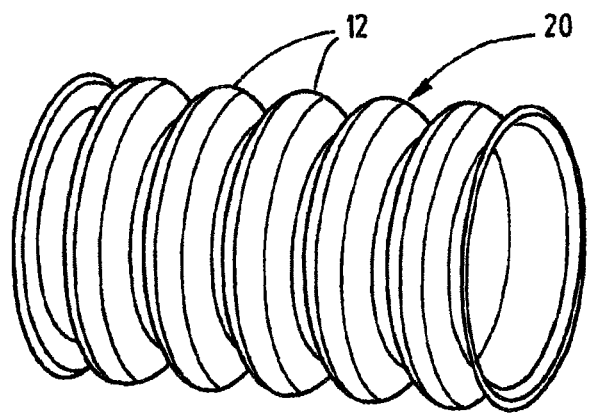
FIG. 49 shows in a diagrammatic view, the bellows after demolding.
Figure 50:
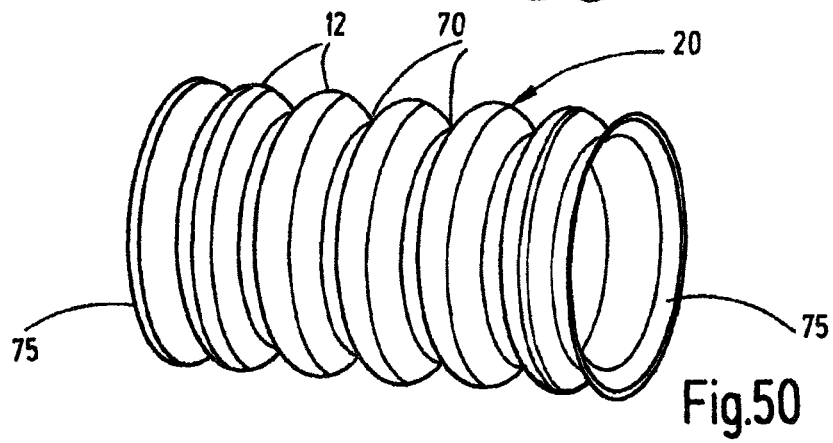
FIG. 50 shows in a diagrammatic view, the finished bellows assembled with support and V-flange rings.

After the vulcanization, the pressing reel or pressing film and the contour rings 160 are removed before trimming (FIG. 47). The bellows 20 is then trimmed (FIG. 48). This is followed by demolding and the bellows 20 is obtained (FIG. 49). The bellows 20 is then assembled with the support rings 70, 160 and V flange rings (FIG. 50).

Figure 51:
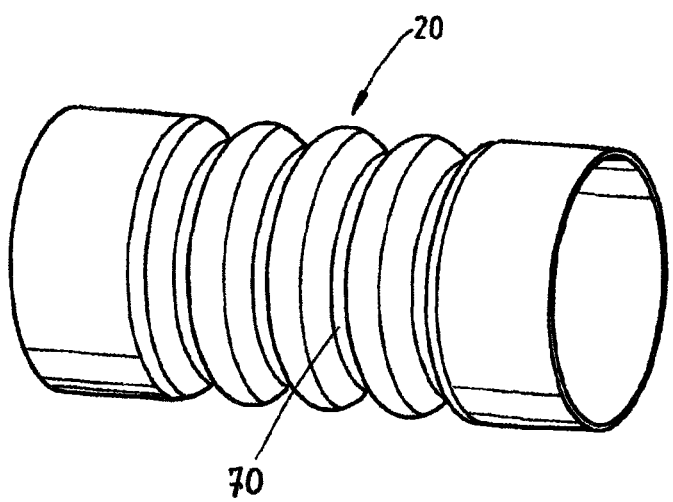
FIG. 51 shows in a diagrammatic view, the finished bellows assembled with support rings but smooth ends (sockets)

FIG. 51 shows the finished bellows 20 assembled with support rings.

Figure 52:
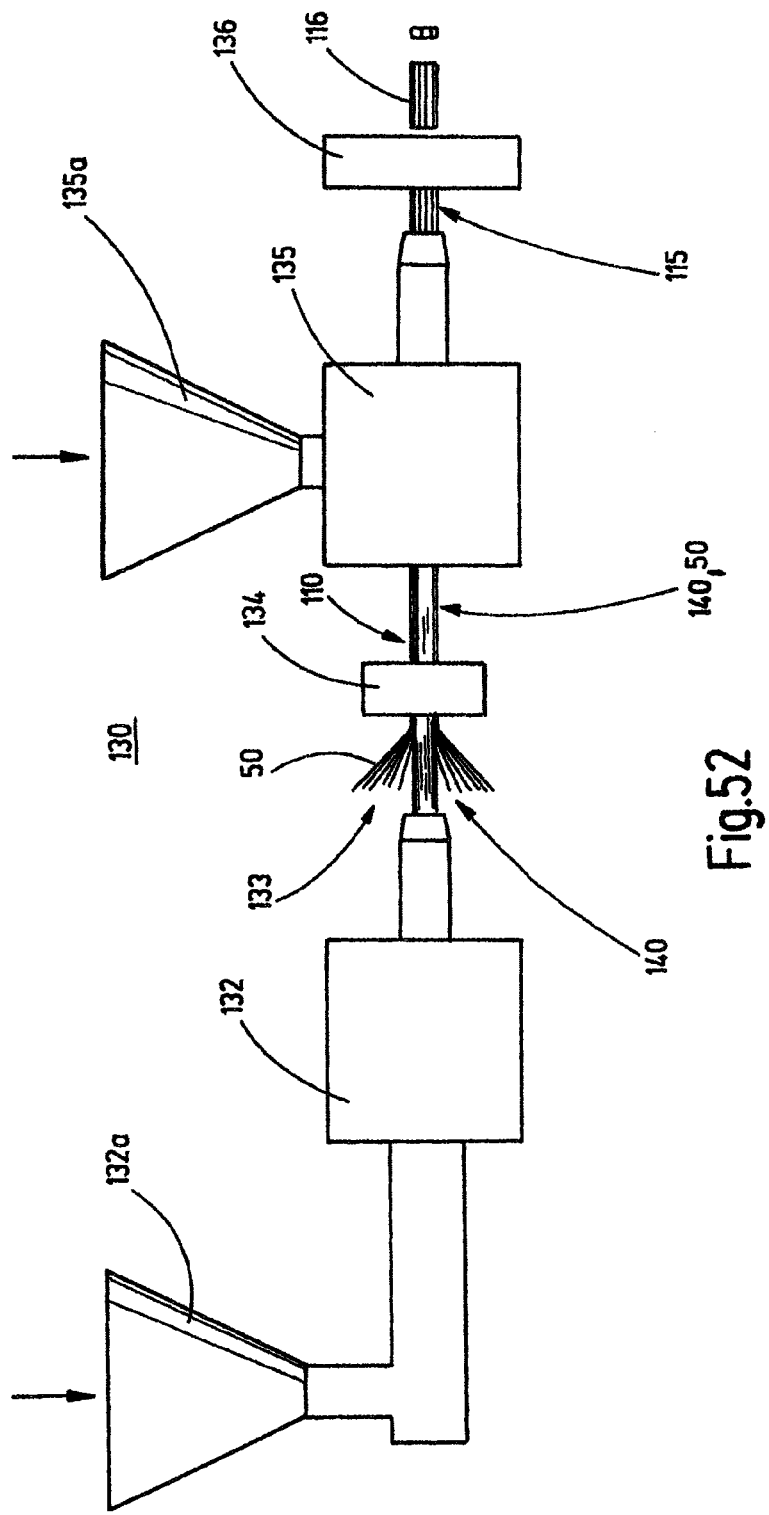
FIG. 52 shows in a side view an extrusion system for producing strand-shaped molded body blanks comprising a first extruder, a device for supplying cord filaments, a device for thread fixing, a second extruder and a device for cutting the blanks to length.

A method of manufacture for a bellows 20 operates according to the invention by extrusion of a strand-shaped or tubular blank 115 according to FIGS. 52 and 53. This method is carried out in an extrusion system 130. The extrusion system 130 comprises a first extruder 132 with which a strand-shaped inner liner 140 is produced. The first extruder 132 is followed by a device 133 for feeding the cord filaments 50 which are fed in the longitudinal direction. This is then followed by a second extruder 135 via which the elastomeric or thermoplastic material is supplied, which leads to an embedding of the cord filaments in the elastomer or the thermoplastic. The strand-shaped endless blank 115 thus obtained is fed to a device 136 for cutting individual blank sections 116 to length for cutting to length for further processing. Material hoppers or feeds 132a, 135a are provided ahead of the extruders 132, 135. The elastomeric or thermoplastic materials are supplied via these material hoppers or feeds. The blank sections 116 obtained are then formed into individual bellows by means of corresponding molding tools 100 or by means of the cylindrical core tool 80 according to FIG. 10 or by means of profile rollers according to FIG. 42, 43 or 44 or by means of the pressing reel method according to FIG. 46.

This extrusion method has the advantage that on the one hand, elastomeric or thermoplastic materials are processed for which by means of the extruder subsequently moldable/vulcanizable tubular blanks are prepared in which the cord filaments 50 are inserted at the same time. FIG. 54 shows a section of the blank section 116 with the inner liner 140, the cord filaments 50 and the embedding of the cord filaments in an elastomer or thermoplastic 45.

Figure 55:
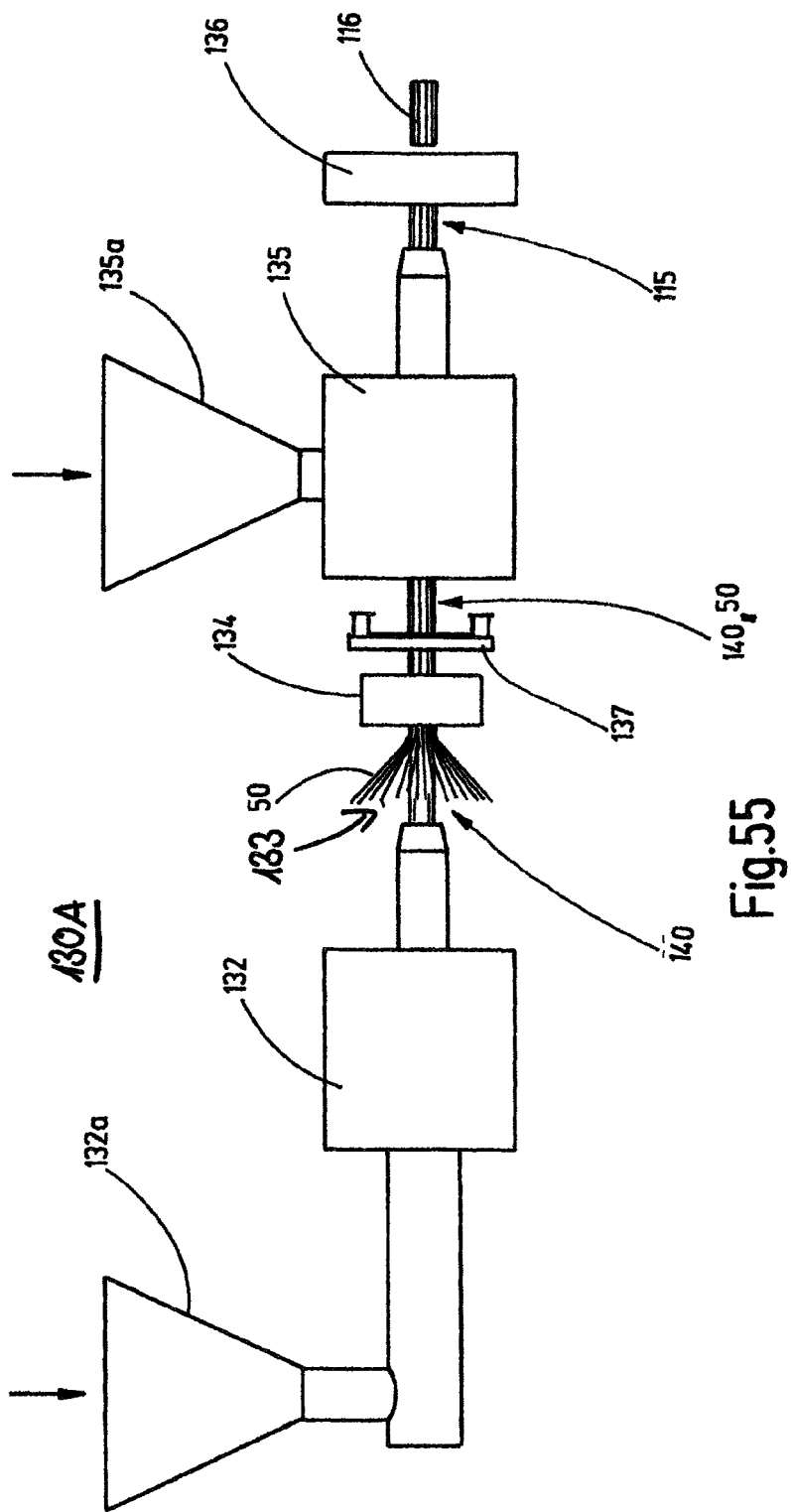
FIG. 55 shows in a side view, an extrusion system for producing molded body blanks comprising a first extruder, a device for supplying cord filaments, a device for thread fixing, a device for applying flyer threads, a second extruder and a device for cutting the blanks to length.

The extrusion system 130A according to FIGS. 55 and 56 corresponds to the structure of the extrusion system 130 according to FIGS. 52 and 53. In the same way blank sections 116 are obtained, comprising an inner liner 140, the cord filaments 50 and the embedding thereof in an elastomer or thermoplastic.

In this respect the extrusion system 130A according to FIGS. 55 and 56 is expanded so that a device 137 for supplying a flyer thread is provided between the device 134 for thread fixing and the second extruder 135, so that the inner liner 140 can be provided with fixing threads which run in a helical manner transversely or diagonally to the cord filaments 50 running in the longitudinal direction.

FIG. 57 shows a section of the blank section 116 with the inner liner 140, the cord filaments 50 and the embedding of the cord filaments 50 in an elastomer or thermoplastic.

Figure 62:
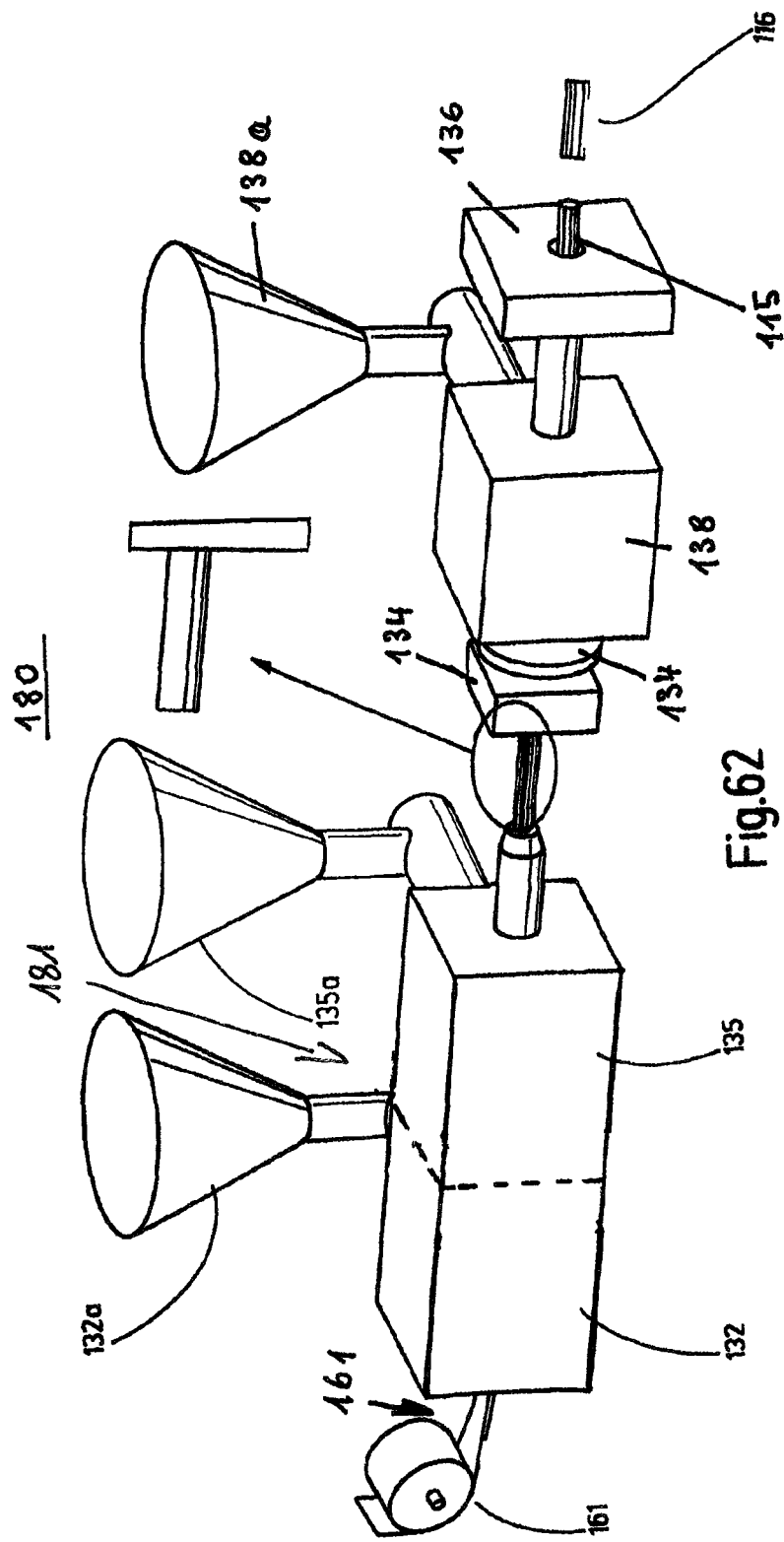
FIG. 62 shows a diagrammatic view of the T-co-extrusion system according to FIG. 61.

Another method of manufacture for a bellows 20 is accomplished according to the invention by extrusion of a strand-shaped and tubular blank 115 by means of T-co-extrusion systems 170, 180 according to FIGS. 58 and 59 and according to FIGS. 61 and 62. Each T-co-extrusion system 170, 180 has as a T-co-extruder 171 and 181 respectively two extrusion mouths (annular nozzles) 132 and 135 inside an extruder head. The two extruder ring nozzles 132 and 135 are provided with the feeds 132A and 135A for elastomeric or thermoplastic materials.

The basic structure of the two extrusion systems 170, 180 is the same for both systems.

A device for supplying cord filaments 50 as flat material on the front side is provided upstream of the first extruder ring nozzle 132 of the extrusion system 170 In the T-co-extruder head 171, above the first extrusion of the inner core, the flat web material of the cord filaments of this flat web is shaped round over this inner core 140 and overmoulded with another layer of elastomer and thermoplastic by a following ring nozzle 135.

In FIG. 61 the blank consisting of inner liner 140 with a layer of cord filaments 50 located thereabove is formed and then oversprayed with a cover layer. This T-co-extrusion system 170 can either stand alone or be followed by another device 133 for feeding cord filaments 50, a device 137 for applying flyer threads, in order to obtain a stronger wall and one or more layers of the strength support in the form of longitudinally lying threads, fibres or cord filaments. Another extruder 138 (FIGS. 61 and 62) or others can follow this described arrangement. This is followed by a device 136 for cutting blank sections 116 to length. The two T-co-extrusion systems 170, 180 are constructed in the same way. The extrusion system 180 is expanded compared with the extrusion system 170 insofar as a device 137 for applying flyer threads and another extruder 138 having an associated material hopper/feed 138a are provided, via which the elastomer or thermoplastic is supplied so that an endless blank 115 with two layers of cord filaments is obtained. The endless blank 115 is then processed to form individual blank sections 116 (FIG. 61) from which the bellows 20 are then formed.

The blank sections 116 obtained are shaped into the individual bellows 20 by means of appropriate molding tools 100 or by means of the cylindrical core tools 80 according to FIG. 10 or by means of profile rollers according to FIG. 42, 43 or 44 or by means of the pressing reel method according to FIG. 46.

Blanks for producing bellows 20 having a layer of cord filaments 50 are produced by means of the T-co-extrusion system 170. The T-co-extrusion system 180 enables the production of blanks for producing bellows 20 having two layers of cord filaments. With a suitable design of the T-co-extrusion system, blanks having more than two layers of cord filaments can be produced if thick-walled bellows are to be produced.

REFERENCE NUMERAL LIST

100 Molding tool
10 Molded body
10a Blank
11 Wall surface
12 Corrugated profile
13 Longitudinal axis at bellows
14, 14a Wave troughs
15 Raised molded body section
20 Bellows
30, 30', 30a Strength support insert
40 Thermoplastic
45 Bedding material
50 Cord filaments
60 Fixing threads
61 Row
62 Row
70 Annular body
80 Core tool
81 Corrugated profile
82 Axis of core tool
83 Corrugated profile
90 Surface structure
95 Roller
96 Section
99 Blank
101 Upper tool
102 Lower tool
103a Shaping surface
103 Upper/outer mold
104a Shaping surface
104 Lower/inner mold
110 Strand
111 Strand section
115 Blank
116 Blank section
120 Annular body
130, 130a Extrusion system
132 Extruder ring nozzle
132a Material hopper
133 Device
134 Device
135 Extruder ring nozzle
135a Material hopper
136 Device
137 Device
138 Additional extruder
140 Inner liner
140a Strip section
141, 141a Strip section
145 Roller
150 Profile roller
151 Profile
160 Blank
161 Feed
170 T-co-extruder system
171 T-co-extruder
180 T-co-extruder system
181 T-co-extruder
190 Pressing film

The invention claimed is:

1. Flexible tubular molded body comprising:
a wall surface with a corrugated profile having annular trough-shaped or drawn-in molded body sections and having annular raised molded body sections and formed of a vulcanizable material, an elastomer, or a thermoplastic;
at least one strength support insert as pressure body which is embedded in the wall surface wherein each strength support insert includes threads or fibres or cord filaments, which run parallel to one another and at a distance from one another in the longitudinal direction of the molded body, and/or fixing threads running transversely or diagonally to the threads or fibres or cord filaments running in the longitudinal direction and holding the threads or fibres or cord filaments in position, wherein the threads or fibres or cord filaments and the fixing threads are embedded in a vulcanizable bedding material, or in an elastomer, natural rubber, synthetic rubber, silicone rubber or thermoplastic bedding material; and
annular bodies made of a metal material or of a plastic and disposed in the trough-shaped molded body sections to preserve the corrugated contour under internal pressure or to increase the compressive strength of the parts or to preserve the contour-dependent elasticity and flexibility.

2. Flexible tubular molded body according to claim 1, characterised in that the bedding material for the threads or fibres and for the cord filaments running in the longitudinal direction and for the fixing threads consists of a dimensionally stable rubber-elastic elastomer.

3. Flexible tubular molded body according to claim 1, characterised in that the bedding material for the threads or fibres and for the cord filaments running in the longitudinal direction and for the fixing threads consists of a thermoplastic such as polyethylene, polypropylene, polyvinyl chloride, polystyrene, polyamide etc.

4. Flexible tubular molded body according to claim 1, characterised in that the fixing threads holding the threads or fibres or cord filaments running in the longitudinal direction in position and at a distance, have a smaller thickness compared with the thickness of these.

5. Flexible tubular molded body according to claim 1, characterised in that the threads or fibres or cord filaments running in the longitudinal direction consist of monofilament fibres spun as staple fibres, also twisted from these, made of thermoplastics, charcoal/carbon, ceramic, glass, metal and natural fibres as well as combinations of these materials (hybrids).

6. Flexible tubular molded body according to claim 1, characterised in that the fixing threads holding the threads or fibres or cord filaments of the strength support insert running in the longitudinal direction at a distance and in position, are guided in the manner of warp threads of a fabric consisting of weft and warp threads around and over the threads or fibres or the cord filaments.

7. Flexible tubular molded body according to claim 1, characterised in that the molded body acquires its corrugated shape to form the bellows by means of a molded tool consisting of an upper raisable and lowerable tool and a lower fixed or raisable and lowerable tool, wherein the upper tool and the lower tool are configured with shaping surfaces corresponding to the shape of the molded body to be produced in such a manner that the shaping surfaces complement each other to the shape of the corrugated molded body to be produced.

8. Flexible tubular molded body according to claim 1, characterised in that the molded body acquires its corrugated shape for forming the bellows by means of a feeding press bandage or downward-pressing rollers producing the corrugated profile or profile round bodies which produce the corrugated profile and the press bandage corning in thereover.

9. Flexible tubular molded body according to claim 1, characterised in that a strength support insert comprising threads or fibres or cord filaments running in the longitudinal direction of the molded body and transversely running fixing fibres is disposed in the circumferential wall of the molded body.

10. Flexible tubular molded body according to claim 1, characterised in that multiple strength support inserts comprising threads or fibres or cord filaments running in the longitudinal direction of the molded body and transversely running fixing fibres are disposed in the circumferential wall of the molded body, wherein the strength support inserts are arranged one above the other in such a manner that the threads or fibres or cord filaments of the respectively uppermost strength support insert running in the longitudinal direction of the molded body come to lie above the threads or fibres or cord filaments of the respective strength support insert lying thereunder or that the threads or fibres or cord filaments of the respectively uppermost strength support insert running in the longitudinal direction of the molded body are arranged offset over the threads or fibres or cord filaments, so that the threads or fibres or cord filaments of the respectively uppermost strength support insert come to lie above the intermediate spaces between the threads or fibres or cord filaments of the respective strength support insert lying thereunder.

11. Flexible tubular molded body according to claim 1, characterised in that an inner surface of the wall surface of the molded body is formed by an inner liner on which the embedded strength support insert is disposed with the cord filaments and with or without fixing thread.

* * * * *